(12) United States Patent
Hou et al.

(10) Patent No.: US 10,990,815 B2
(45) Date of Patent: Apr. 27, 2021

(54) IMAGE PRE-PROCESSING IN A LANE MARKING DETERMINATION SYSTEM

(71) Applicant: Beijing DiDi Infinity Technology and Development Co., Ltd., Beijing (CN)

(72) Inventors: Tingbo Hou, Santa Clara, CA (US); Yan Zhang, Sunnyvale, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 159 days.

(21) Appl. No.: 16/234,130

(22) Filed: Dec. 27, 2018

(65) Prior Publication Data
US 2020/0210696 A1 Jul. 2, 2020

(51) Int. Cl.
*G06K 9/00* (2006.01)

(52) U.S. Cl.
CPC ..... *G06K 9/00476* (2013.01); *G06K 9/00798* (2013.01)

(58) Field of Classification Search
CPC .............. G06K 9/00476; G06K 9/00798
USPC .......................................... 382/113
See application file for complete search history.

(56) References Cited

U.S. PATENT DOCUMENTS

| 10,488,215 | B1 | 11/2019 | Yu |
| 2005/0271296 | A1 | 12/2005 | Tsuji et al. |
| 2010/0268452 | A1 | 10/2010 | Kindo et al. |
| 2013/0028473 | A1 | 1/2013 | Hilldore et al. |
| 2014/0036076 | A1 | 2/2014 | Nerayoff et al. |
| 2017/0132512 | A1 | 5/2017 | Ioffe |
| 2018/0137373 | A1* | 5/2018 | Rasmusson, Jr. .... G05D 1/0088 |
| 2018/0225527 | A1 | 8/2018 | He et al. |
| 2018/0268584 | A1 | 9/2018 | Bobovich et al. |
| 2018/0300880 | A1 | 10/2018 | Fan et al. |
| 2020/0026282 | A1 | 1/2020 | Choe et al. |

(Continued)

FOREIGN PATENT DOCUMENTS

| CN | 107066952 A | 8/2017 |
| CN | 107220976 A * | 9/2017 |

(Continued)

OTHER PUBLICATIONS

CN 107220976 Liu et al, machine translated https://patentscope.wipo.int/search/en/details.jsf?docId=CN205433016&_cid=P12-K9X2HS-38242-1 (Year: 2017).

(Continued)

*Primary Examiner* — Amandeep Saini
(74) *Attorney, Agent, or Firm* — Knobbe, Martens, Olson & Bear, LLP

(57) ABSTRACT

Systems and processes can reduce or divide images of road networks into sub-images that depict straight or substantially straight sections of roads in the road networks. These sub-images or image segments can be normalized by, for example, rotating each of the sub-images such that the depicted roads are horizontal or otherwise share the same angle. By aligning disparate images of roads, it is possible to both reduce the amount of training data used to generate a machine learning model and to increase the accuracy of an automated lane marking or labelling system. Further, the use of normalized images by the machine learning model enables a reduction in computing resources used to perform automated lane marking processes while maintaining or improving accuracy of the lane marking processes.

20 Claims, 14 Drawing Sheets

(56) References Cited

U.S. PATENT DOCUMENTS

| | | |
|---|---|---|
| 2020/0183411 A1 | 6/2020 | Oba |
| 2020/0193157 A1 | 6/2020 | Soni |
| 2020/0210717 A1 | 7/2020 | Hou et al. |
| 2020/0210769 A1 | 7/2020 | Hou et al. |

FOREIGN PATENT DOCUMENTS

| | | | |
|---|---|---|---|
| CN | 107220976 A | | 9/2017 |
| CN | 107704801 A | * | 2/2018 |
| CN | 109002795 A | | 12/2018 |
| KR | 10-2014-0137100 A | | 12/2014 |
| KR | 20140137100 A | * | 12/2014 |
| WO | WO 2020/0139355 | | 7/2020 |
| WO | WO 2020/139356 | | 7/2020 |
| WO | WO 2020/139357 | | 7/2020 |

OTHER PUBLICATIONS

International Search Report dated Apr. 25, 2019 for International Patent Application No. PCT/US2018/067734, filed Dec. 27, 2018. 7 pages.
International Search Report dated May 2, 2019 for International Patent Application No. PCT/US2018/067744, filed Dec. 27, 2018. 7 pages.
International Search Report and Written Opinion in PCT Application No. PCT/2018/067739 dated Apr. 26, 2019 in 9 pages.

* cited by examiner

IMAGE PRE-PROCESSING IN A LANE MARKING DETERMINATION SYSTEM

INCORPORATION BY REFERENCE TO ANY PRIORITY APPLICATIONS

Any and all applications, if any, for which a foreign or domestic priority claim is identified in the Application Data Sheet of the present application are hereby incorporated by reference in their entireties under 37 CFR 1.57. Further, this disclosure is related to the following disclosures that were filed on Dec. 27, 2018, the same date as the present disclosure, and which are hereby incorporated by reference in their entirety for all purposes herein: U.S. application Ser. No. 16/233,960, titled "USING IMAGE PRE-PROCESSING TO GENERATE A MACHINE LEARNING MODEL"; and U.S. application Ser. No. 16/233,989, titled "SYSTEM FOR AUTOMATED LANE MARKING."

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Vehicles—such as vehicles used for ride-sharing purposes, vehicles that provide driver-assist functionality, and/or automated or autonomous vehicles (AVs)—may obtain and process sensor data using an on-board data processing system to perform a variety of functions. For example, functions can include determining and/or displaying navigational routes, identifying road signs, detecting objects and/or road obstructions, controlling vehicle operation, and/or the like.

Some of the variety of functions performed by the on-board data processing system relate to the use of maps and/or images of roads. For example, providing navigational routes may rely on maps provided to the on-board data processing system. These maps may be obtained using imaging systems and/or user-provided data. Sometimes the maps are out-of-date or provide less than optimal information for certain functions (e.g., navigational routing) because, for example, changes in road networks, accidents, weather conditions, or unexpected events. Further, even when maps are current, some maps are insufficiently granular for certain functions. For example, a map that illustrates the existence of roads may be sufficient for providing a route, but may be insufficient for autonomous driving, which may require additional information (e.g., speed zone information).

SUMMARY

As previously described, certain functions performed by on-board data processing systems rely on maps and/or images of roads. Alternatively, the on-board data processing systems may rely on data that is obtained from or otherwise corresponds to map-data. Some of the functions that rely on maps, images of roads, and/or map-data include navigational routing, autonomous driving, driving-assist functionality, or ride-sharing routing, and the like. Many of these functions require or are otherwise improved by having access to lane-marking data. For example, for an autonomous vehicle to remain within a particular lane, it is useful, if not necessary, to identify lane markings on roads or road networks.

One method of providing lane marking data to a mapping or routing system is to have a user manually identify lane markings within mapping or image data that is provided to a routing or autonomous driving system. However, manually identifying lane markings can be insufficient and problematic for a number of reasons. For example, the number of roads and the amount of lane markings in a road network may make manual marking prohibitive, human users are prone to mistakes, and road and lane markings change over time requiring constant updates. Thus, manual lane marking is not feasible for a large or real-world road network.

Another method of providing lane marking data is to use an automated lane marking system. An automated lane marking system can analyze images of maps to determine the existence of and the location of lane markings on roads. As a road network and/or lane markings change over time, the automated lane marking system can analyze updated images to determine the location of lanes. The use of an automated system makes lane marking more tenable compared to manual marking. However, because roads are not consistent in direction and shape, and because lane markings can vary greatly (e.g., different colors, different shapes, solid lines versus broken lines, etc.) among different roads in a road network, a large amount of training data may be required to train machine learning systems that can be used to generate machine learning models. The machine learning models may be used in the automated lane marking processes. Further, a large amount of computing resources including both memory, processing speed, and processing time may be required to performed automated lane marking processes.

Moreover, in some cases, the images of the maps may include significantly more extraneous data than road-related data. For example, the images of the maps may include buildings, trees, and other non-road related environmental features. Thus, in some cases, the percentage of the image that includes pixels relating to a road versus pixels relating to a background, or non-road related images may be relatively low. For instance, in some cases, the road may be 25%, 15%, 10%, any value in between the aforementioned examples, or less of the image. Having significantly more non-road related pixels than road-related pixels can result in inaccurate processing by the machine learning model or may result in relatively large amounts of training data for generating the machine learning model, which in turn can require greater amounts of computing resources to process.

Embodiments disclosed herein present systems and processes that can reduce or divide images of road networks into sub-images that depict straight or substantially straight sections of roads in the road networks. Further, embodiments disclosed herein can normalize each of the sub-images by, for example, rotating each of the sub-images such that the depicted roads are horizontal or otherwise share the same angle. Advantageously, in certain embodiments, the systems and processes disclosed herein reduce the amount of training data used in machine learning systems to create machine learning models for automated lane marking systems and processes. Further, embodiments disclosed herein may be as accurate, or more accurate, compared to systems that use greater amounts of training data. In addition, embodiments disclosed herein reduce the amount of computing resources used to perform automated lane marking processes while maintaining or improving accuracy of the lane marking processes.

In addition, certain embodiments disclosed herein can identify non-road portions of the divided images and crop the divided images to increase the percentage of the divided images that include road while decreasing the percentage of the divided images that include background material or pixels. By emphasizing foreground pixels associated with the road and deemphasizing background pixels relating to non-road aspects of images, the accuracy of the machine learning models can be improved while reducing the amount of training data, and consequently reducing the amount of computing resources, used to generate the machine learning models.

DETAILED DESCRIPTION

Detailed descriptions and examples of systems and methods according to one or more illustrative embodiments of the present disclosure may be found in the section entitled Machine Learning Based Lane Marking System, as well as in the section entitled Example Embodiments, and also in FIGS. 2A-10 herein. Furthermore, components and functionality for a Machine Learning Based Lane Marking System may be configured and/or incorporated into the networked vehicle environment 100 described herein in FIGS. 1A-1B.

Various embodiments described herein are intimately tied to, enabled by, and would not exist except for, vehicle and/or computer technology. For example, an automated machine learning based lane marking system described herein in reference to various embodiments cannot reasonably be performed by humans alone, without the vehicle and/or computer technology upon which they are implemented.

Networked Vehicle Environment

Figure 1A:
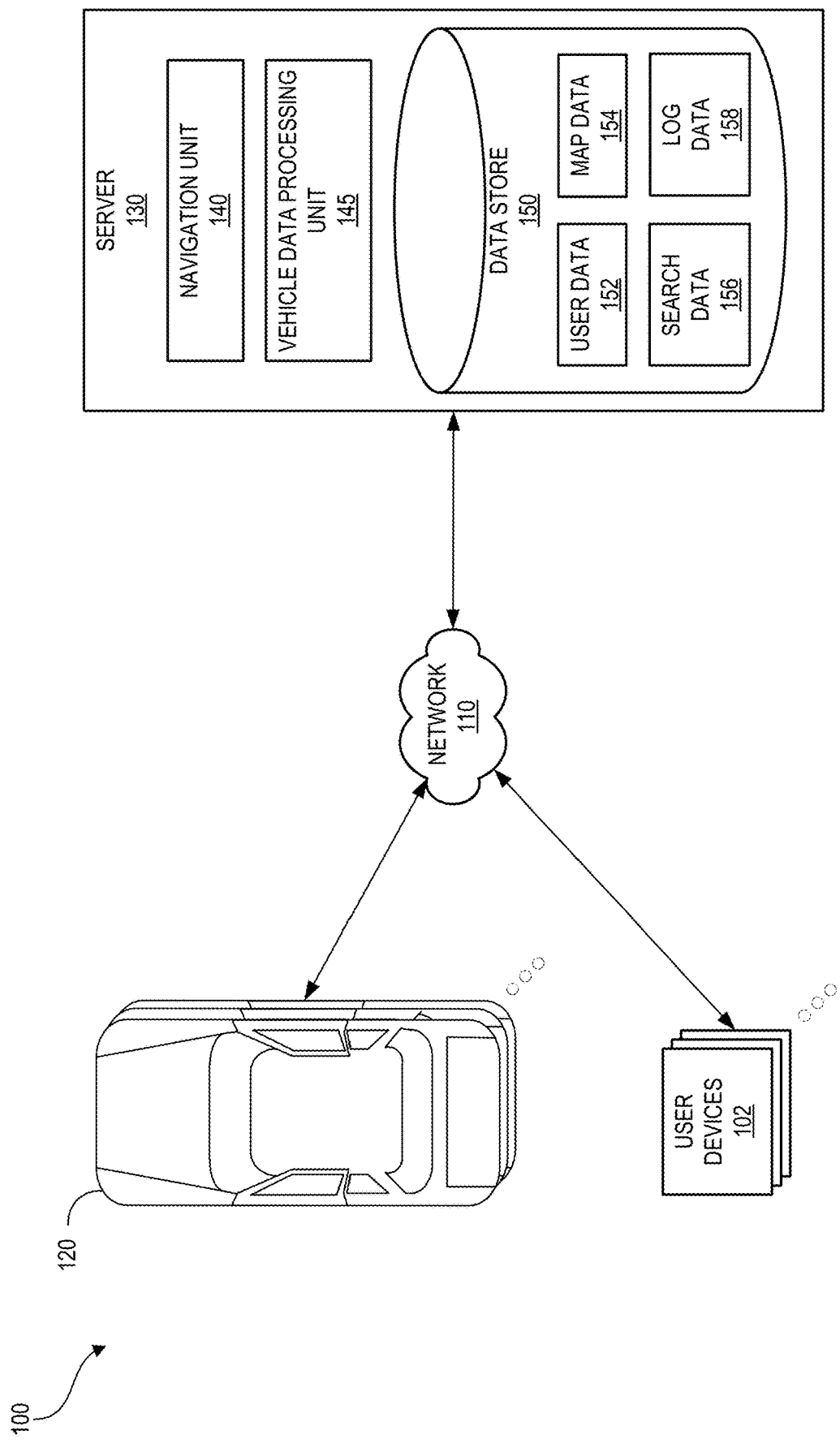
FIG. 1A illustrates a block diagram of a networked vehicle environment in which one or more vehicles and/or one or more user devices interact with a server via a network, according to one embodiment.

FIG. 1A illustrates a block diagram of a networked vehicle environment 100 in which one or more vehicles 120 and/or one or more user devices 102 interact with a server 130 via a network 110, according to one embodiment. For example, the vehicles 120 may be equipped to provide ride-sharing and/or other location-based services, to assist drivers in controlling vehicle operation (e.g., via various driver-assist features, such as adaptive and/or regular cruise control, adaptive headlight control, anti-lock braking, automatic parking, night vision, blind spot monitor, collision avoidance, crosswind stabilization, driver drowsiness detection, driver monitoring system, emergency driver assistant, intersection assistant, hill descent control, intelligent speed adaptation, lane centering, lane departure warning, forward, rear, and/or side parking sensors, pedestrian detection, rain sensor, surround view system, tire pressure monitor, traffic sign recognition, turning assistant, wrong-way driving warning, traffic condition alerts, etc.), and/or to fully control vehicle operation. Thus, the vehicles 120 can be regular gasoline, natural gas, biofuel, electric, hydrogen, etc. vehicles configured to offer ride-sharing and/or other location-based services, vehicles that provide driver-assist functionality (e.g., one or more of the driver-assist features described herein), and/or automated or autonomous vehicles (AVs). The vehicles 120 can be automobiles, trucks, vans, buses, motorcycles, scooters, bicycles, and/or any other motorized vehicle.

The server 130 can communicate with the vehicles 120 to obtain vehicle data, such as route data, sensor data, perception data, vehicle 120 control data, vehicle 120 component fault and/or failure data, etc. The server 130 can process and store the vehicle data for use in other operations performed by the server 130 and/or another computing system (not shown). Such operations can include running diagnostic models to identify vehicle 120 operational issues (e.g., the cause of vehicle 120 navigational errors, unusual sensor readings, an object not being identified, vehicle 120 component failure, etc.); running models to simulate vehicle 120 performance given a set of variables; identifying objects that cannot be identified by a vehicle 120, generating control instructions that, when executed by a vehicle 120, cause the vehicle 120 to drive and/or maneuver in a certain manner along a specified path; and/or the like.

The server 130 can also transmit data to the vehicles 120. For example, the server 130 can transmit map data, firmware and/or software updates, vehicle 120 control instructions, an identification of an object that could not otherwise be identified by a vehicle 120, passenger pickup information, traffic data, and/or the like.

In addition to communicating with one or more vehicles 120, the server 130 can communicate with one or more user devices 102. In particular, the server 130 can provide a network service to enable a user to request, via an application running on a user device 102, location-based services (e.g., transportation services, such as ride-sharing services). For example, the user devices 102 can correspond to a computing device, such as a smart phone, tablet, laptop, smart watch, or any other device that can communicate over the network 110 with the server 130. In the embodiment, a user device 102 executes an application, such as a mobile application, that the user operating the user device 102 can use to interact with the server 130. For example, the user device 102 can communicate with the server 130 to provide location data and/or queries to the server 130, to receive map-related data and/or directions from the server 130, and/or the like.

The server 130 can process requests and/or other data received from user devices 102 to identify service providers (e.g., vehicle 120 drivers) to provide the requested services for the users. In addition, the server 130 can receive data—such as user trip pickup or destination data, user location query data, etc.—based on which the server 130 identifies a region, an address, and/or other location associated with the various users. The server 130 can then use the identified location to provide services providers and/or users with directions to a determined pickup location.

The application running on the user device 102 may be created and/or made available by the same entity responsible for the server 130. Alternatively, the application running on the user device 102 can be a third-party application that includes features (e.g., an application programming interface or software development kit) that enables communications with the server 130.

A single server 130 is illustrated in FIG. 1A for simplicity and ease of explanation. It is appreciated, however, that the server 130 may be a single computing device, or may include multiple distinct computing devices logically or physically grouped together to collectively operate as a server system. The components of the server 130 can be implemented in application-specific hardware (e.g., a server computing device with one or more ASICs) such that no software is necessary, or as a combination of hardware and software. In addition, the modules and components of the server 130 can be combined on one server computing device or separated individually or into groups on several server computing devices. In some embodiments, the server 130 may include additional or fewer components than illustrated in FIG. 1A.

The network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The server 130 can include a navigation unit 140, a vehicle data processing unit 145, and a data store 150. The navigation unit 140 can assist with location-based services. For example, the navigation unit 140 can facilitate the transportation of a user (also referred to herein as a "rider") and/or an object (e.g., food, packages, etc.) by another user (also referred to herein as a "driver") from a first location (also referred to herein as a "pickup location") to a second location (also referred to herein as a "destination location"). The navigation unit 140 may facilitate user and/or object transportation by providing map and/or navigation instructions to an application running on a user device 102 of a rider, to an application running on a user device 102 of a driver, and/or to a navigational system running on a vehicle 120.

As an example, the navigation unit 140 can include a matching service (not shown) that pairs a rider requesting a trip from a pickup location to a destination location with a driver that can complete the trip. The matching service may interact with an application running on the user device 102 of the rider and/or an application running on the user device 102 of the driver to establish the trip for the rider and/or to process payment from the rider to the driver.

The navigation unit 140 can also communicate with the application running on the user device 102 of the driver during the trip to obtain trip location information from the user device 102 (e.g., via a global position system (GPS) component coupled to and/or embedded within the user device 102) and provide navigation directions to the application that aid the driver in traveling from the current location of the driver to the destination location. The navigation unit 140 can also direct the driver to various geographic locations or points of interest, regardless of whether the driver is carrying a rider.

The vehicle data processing unit 145 can be configured to support vehicle 120 driver-assist features and/or to support autonomous driving. For example, the vehicle data processing unit 145 can generate and/or transmit to a vehicle 120 map data, run diagnostic models to identify vehicle 120 operational issues, run models to simulate vehicle 120 performance given a set of variables, use vehicle data provided by a vehicle 120 to identify an object and transmit an identification of the object to the vehicle 120, generate and/or transmit to a vehicle 120 vehicle 120 control instructions, and/or the like.

The data store 150 can store various types of data used by the navigation unit 140, the vehicle data processing unit 145, the user devices 102, and/or the vehicles 120. For example, the data store 150 can store user data 152, map data 154, search data 156, and log data 158.

The user data 152 may include information on some or all of the users registered with a location-based service, such as drivers and riders. The information may include, for example, usernames, passwords, names, addresses, billing information, data associated with prior trips taken or serviced by a user, user rating information, user loyalty program information, and/or the like.

The map data 154 may include high definition (HD) maps generated from sensors (e.g., light detection and ranging (LiDAR) sensors, radio detection and ranging (RADAR) sensors, infrared cameras, visible light cameras, stereo cameras, an inertial measurement unit (IMU), etc.), satellite imagery, optical character recognition (OCR) performed on captured street images (e.g., to identify names of streets, to identify street sign text, to identify names of points of interest, etc.), etc.; information used to calculate routes; information used to render 2D and/or 3D graphical maps; and/or the like. For example, the map data 154 can include elements like the layout of streets and intersections, bridges (e.g., including information on the height and/or width of bridges over streets), off-ramps, buildings, parking structure entrances and exits (e.g., including information on the height and/or width of the vehicle entrances and/or exits), the placement of street signs and stop lights, emergency turn-offs, points of interest (e.g., parks, restaurants, fuel stations, attractions, landmarks, etc., and associated names), road markings (e.g., centerline markings dividing lanes of opposing traffic, lane markings, stop lines, left turn guide lines, right turn guide lines, crosswalks, bus lane markings, bike lane markings, island marking, pavement text, highway exist and entrance markings, etc.), curbs, rail lines, waterways, turning radiuses and/or angles of left and right turns, the distance and dimensions of road features, the placement of barriers between two-way traffic, and/or the like, along with the elements' associated geographical locations (e.g., geographical coordinates). The map data 154 can also include reference data, such as real-time and/or historical traffic information, current and/or predicted weather conditions, road work information, information regarding laws and regulations (e.g., speed limits, whether right turns on red lights are permitted or prohibited, whether U-turns are permitted or prohibited, permitted direction of travel, and/or the like), news events, and/or the like.

While the map data 154 is illustrated as being stored in the data store 150 of the server 130, this is not meant to be limiting. For example, the server 130 can transmit the map data 154 to a vehicle 120 for storage therein (e.g., in the data store 129, described below).

The search data 156 can include searches entered by various users in the past. For example, the search data 156 can include textual searches for pickup and/or destination locations. The searches can be for specific addresses, geographical locations, names associated with a geographical location (e.g., name of a park, restaurant, fuel station, attraction, landmark, etc.), etc.

The log data 158 can include vehicle data provided by one or more vehicles 120. For example, the vehicle data can include route data, sensor data, perception data, vehicle 120 control data, vehicle 120 component fault and/or failure data, etc.

Figure 1B:
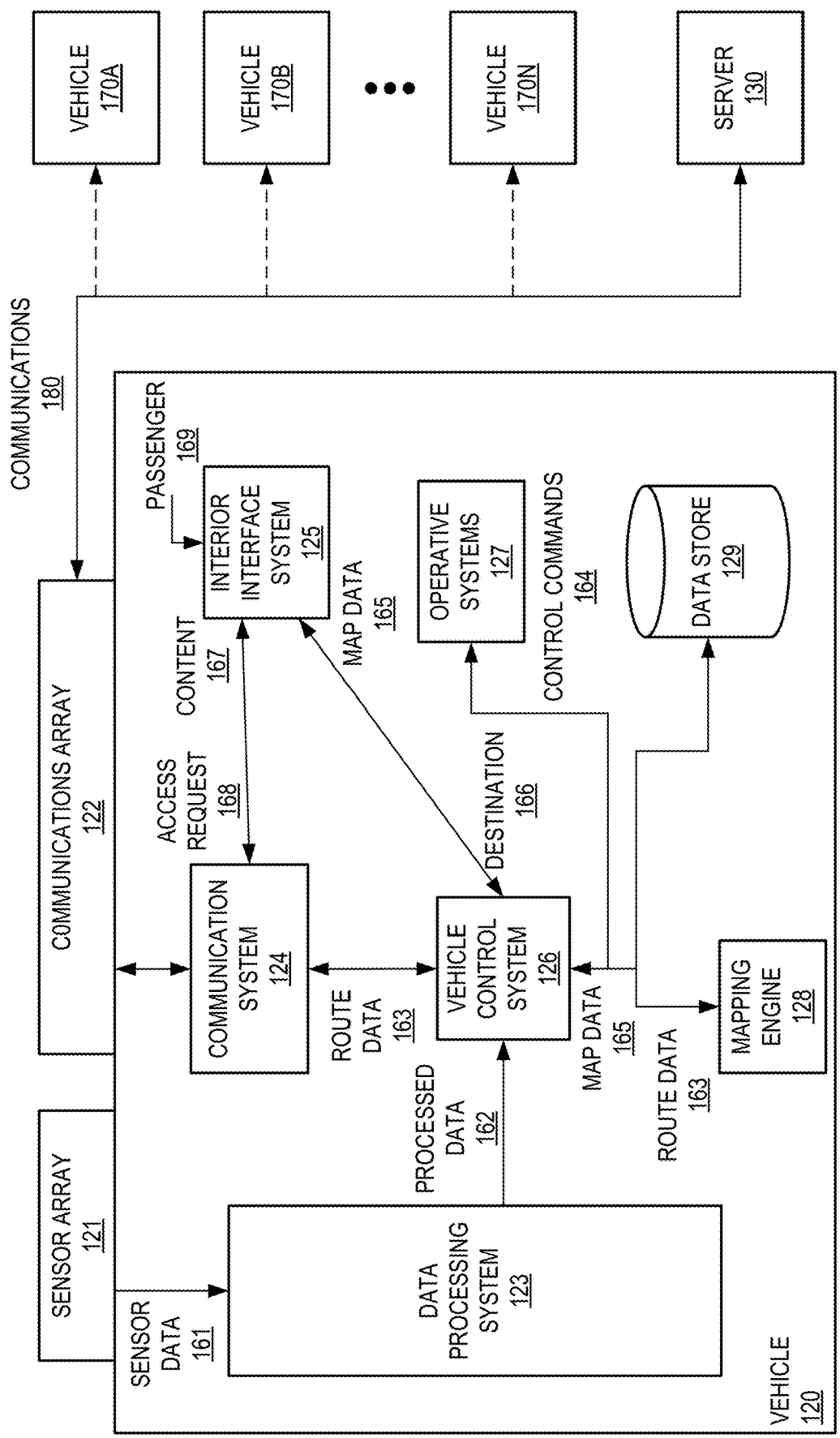
FIG. 1B illustrates a block diagram showing the vehicle of FIG. 1A in communication with one or more other vehicles and/or the server of FIG. 1A, according to one embodiment.

FIG. 1B illustrates a block diagram showing the vehicle 120 of FIG. 1A in communication with one or more other vehicles 170A-N and/or the server 130 of FIG. 1A, according to one embodiment. As illustrated in FIG. 1B, the vehicle 120 can include various components and/or data stores. For example, the vehicle 120 can include a sensor array 121, a communications array 122, a data processing system 123, a communication system 124, an interior interface system 125, a vehicle control system 126, operative systems 127, a mapping engine 128, and/or a data store 129.

Communications 180 may be transmitted and/or received between the vehicle 120, one or more vehicles 170A-N, and/or the server 130. The server 130 can transmit and/or receive data from the vehicle 120 as described above with respect to FIG. 1A. For example, the server 130 can transmit vehicle control instructions or commands (e.g., as communications 180) to the vehicle 120. The vehicle control instructions can be received by the communications array 122 (e.g., an array of one or more antennas configured to transmit and/or receive wireless signals), which is operated by the communication system 124 (e.g., a transceiver). The communication system 124 can transmit the vehicle control instructions to the vehicle control system 126, which can operate the acceleration, steering, braking, lights, signals, and other operative systems 127 of the vehicle 120 in order to drive and/or maneuver the vehicle 120 and/or assist a driver in driving and/or maneuvering the vehicle 120 through road traffic to destination locations specified by the vehicle control instructions.

As an example, the vehicle control instructions can include route data 163, which can be processed by the vehicle control system 126 to maneuver the vehicle 120 and/or assist a driver in maneuvering the vehicle 120 along a given route (e.g., an optimized route calculated by the server 130 and/or the mapping engine 128) to the specified destination location. In processing the route data 163, the vehicle control system 126 can generate control commands 164 for execution by the operative systems 127 (e.g., acceleration, steering, braking, maneuvering, reversing, etc.) to cause the vehicle 120 to travel along the route to the destination location and/or to assist a driver in maneuvering the vehicle 120 along the route to the destination location.

A destination location 166 may be specified by the server 130 based on user requests (e.g., pickup requests, delivery requests, etc.) transmitted from applications running on user devices 102. Alternatively or in addition, a passenger and/or driver of the vehicle 120 can provide user input(s) 169 through an interior interface system 125 (e.g., a vehicle navigation system) to provide a destination location 166. In some embodiments, the vehicle control system 126 can transmit the inputted destination location 166 and/or a current location of the vehicle 120 (e.g., as a GPS data packet) as a communication 180 to the server 130 via the communication system 124 and the communications array 122. The server 130 (e.g., the navigation unit 140) can use the current location of the vehicle 120 and/or the inputted destination location 166 to perform an optimization operation to determine an optimal route for the vehicle 120 to travel to the destination location 166. Route data 163 that includes the optimal route can be transmitted from the server 130 to the vehicle control system 126 via the communications array 122 and the communication system 124. As a result of receiving the route data 163, the vehicle control system 126 can cause the operative systems 127 to maneuver the vehicle 120 through traffic to the destination location 166 along the optimal route, assist a driver in maneuvering the vehicle 120 through traffic to the destination location 166 along the optimal route, and/or cause the interior interface system 125 to display and/or present instructions for maneuvering the vehicle 120 through traffic to the destination location 166 along the optimal route.

Alternatively or in addition, the route data 163 includes the optimal route and the vehicle control system 126 automatically inputs the route data 163 into the mapping engine 128. The mapping engine 128 can generate map data 165 using the optimal route (e.g., generate a map showing the optimal route and/or instructions for taking the optimal route) and provide the map data 165 to the interior interface system 125 (e.g., via the vehicle control system 126) for display. The map data 165 may include information derived from the map data 154 stored in the data store 150 on the server 130. The displayed map data 165 can indicate an estimated time of arrival and/or show the progress of the vehicle 120 along the optimal route. The displayed map data 165 can also include indicators, such as reroute commands, emergency notifications, road work information, real-time traffic data, current weather conditions, information regarding laws and regulations (e.g., speed limits, whether right turns on red lights are permitted or prohibited, where U-turns are permitted or prohibited, permitted direction of travel, etc.), news events, and/or the like.

The user input 169 can also be a request to access a network (e.g., the network 110). In response to such a request, the interior interface system 125 can generate an access request 168, which can be processed by the communication system 124 to configure the communications array 122 to transmit and/or receive data corresponding to a user's interaction with the interior interface system 125 and/or with a user device 102 in communication with the interior interface system 125 (e.g., a user device 102 connected to the interior interface system 125 via a wireless connection). For example, the vehicle 120 can include on-board Wi-Fi, which the passenger(s) and/or driver can access to send and/or receive emails and/or text messages, stream audio and/or video content, browse content pages (e.g., network pages, web pages, etc.), and/or access applications that use network access. Based on user interactions, the interior interface system 125 can receive content 167 via the network 110, the communications array 122, and/or the communication system 124. The communication system 124 can dynamically manage network access to avoid or minimize disruption of the transmission of the content 167.

The sensor array 121 can include any number of one or more types of sensors, such as a satellite-radio navigation system (e.g., GPS), a LiDAR sensor, a landscape sensor (e.g., a radar sensor), an IMU, a camera (e.g., an infrared camera, a visible light camera, stereo cameras, etc.), a Wi-Fi detection system, a cellular communication system, an inter-vehicle communication system, a road sensor communication system, feature sensors, proximity sensors (e.g., infrared, electromagnetic, photoelectric, etc.), distance sensors, depth sensors, and/or the like. The satellite-radio navigation system may compute the current position (e.g., within a range of 1-10 meters) of the vehicle 120 based on an analysis of signals received from a constellation of satellites.

The LiDAR sensor, the radar sensor, and/or any other similar types of sensors can be used to detect the vehicle 120 surroundings while the vehicle 120 is in motion or about to begin motion. For example, the LiDAR sensor may be used to bounce multiple laser beams off approaching objects to assess their distance and to provide accurate 3D information on the surrounding environment. The data obtained from the LiDAR sensor may be used in performing object identification, motion vector determination, collision prediction, and/or in implementing accident avoidance processes. Optionally, the LiDAR sensor may provide a 360° view using a rotating, scanning mirror assembly. The LiDAR sensor may optionally be mounted on a roof of the vehicle 120.

The IMU may include X, Y, Z oriented gyroscopes and/or accelerometers. The IMU provides data on the rotational and linear motion of the vehicle 120, which may be used to calculate the motion and position of the vehicle 120.

Cameras may be used to capture visual images of the environment surrounding the vehicle 120. Depending on the configuration and number of cameras, the cameras may provide a 360° view around the vehicle 120. The images from the cameras may be used to read road markings (e.g., lane markings), read street signs, detect objects, and/or the like.

The Wi-Fi detection system and/or the cellular communication system may be used to perform triangulation with respect to Wi-Fi hot spots or cell towers respectively, to determine the position of the vehicle 120 (optionally in conjunction with then satellite-radio navigation system).

The inter-vehicle communication system (which may include the Wi-Fi detection system, the cellular communication system, and/or the communications array 122) may be used to receive and/or transmit data to the other vehicles 170A-N, such as current speed and/or location coordinates of the vehicle 120, time and/or location coordinates corresponding to when deceleration is planned and the planned rate of deceleration, time and/or location coordinates when a stop operation is planned, time and/or location coordinates when a lane change is planned and direction of lane change, time and/or location coordinates when a turn operation is planned, time and/or location coordinates when a parking operation is planned, and/or the like.

The road sensor communication system (which may include the Wi-Fi detection system and/or the cellular communication system) may be used to read information from road sensors (e.g., indicating the traffic speed and/or traffic congestion) and/or traffic control devices (e.g., traffic signals).

When a user requests transportation (e.g., via the application running on the user device 102), the user may specify a specific destination location. The origination location may be the current location of the vehicle 120, which may be determined using the satellite-radio navigation system installed in the vehicle (e.g., GPS, Galileo, BeiDou/COMPASS, DORIS, GLONASS, and/or other satellite-radio navigation system), a Wi-Fi positioning System, cell tower triangulation, and/or the like. Optionally, the origination location may be specified by the user via a user interface provided by the vehicle 120 (e.g., the interior interface system 125) or via the user device 102 running the application. Optionally, the origination location may be automatically determined from location information obtained from the user device 102. In addition to the origination location and destination location, one or more waypoints may be specified, enabling multiple destination locations.

Raw sensor data 161 from the sensor array 121 can be processed by the on-board data processing system 123. The processed data 162 can then be sent by the data processing system 123 to the vehicle control system 126, and optionally sent to the server 130 via the communication system 124 and the communications array 122.

The data store 129 can store map data (e.g., the map data 154) and/or a subset of the map data 154 (e.g., a portion of the map data 154 corresponding to a general region in which the vehicle 120 is currently located). In some embodiments, the vehicle 120 can use the sensor array 121 to record updated map data along traveled routes, and transmit the updated map data to the server 130 via the communication system 124 and the communications array 122. The server 130 can then transmit the updated map data to one or more of the vehicles 170A-N and/or further process the updated map data.

The data processing system 123 can provide continuous or near continuous processed data 162 to the vehicle control system 126 to respond to point-to-point activity in the surroundings of the vehicle 120. The processed data 162 can comprise comparisons between the raw sensor data 161—which represents an operational environment of the vehicle 120, and which is continuously collected by the sensor array 121—and the map data stored in the data store 129. In an example, the data processing system 123 is programmed with machine learning or other artificial intelligence capabilities to enable the vehicle 120 to identify and respond to conditions, events, and/or potential hazards. In variations, the data processing system 123 can continuously or nearly continuously compare raw sensor data 161 to stored map data in order to perform a localization to continuously or nearly continuously determine a location and/or orientation of the vehicle 120. Localization of the vehicle 120 may allow the vehicle 120 to become aware of an instant location and/or orientation of the vehicle 120 in comparison to the stored map data in order to maneuver the vehicle 120 on surface streets through traffic and/or assist a driver in maneuvering the vehicle 120 on surface streets through traffic and identify and respond to potential hazards (e.g., pedestrians) or local conditions, such as weather or traffic conditions.

Furthermore, localization can enable the vehicle 120 to tune or beam steer the communications array 122 to maximize a communication link quality and/or to minimize interference with other communications from other vehicles 170A-N. For example, the communication system 124 can beam steer a radiation patterns of the communications array 122 in response to network configuration commands received from the server 130. The data store 129 may store current network resource map data that identifies network base stations and/or other network sources that provide network connectivity. The network resource map data may indicate locations of base stations and/or available network types (e.g., 3G, 4G, LTE, Wi-Fi, etc.) within a region in which the vehicle 120 is located.

While FIG. 1B describes certain operations as being performed by the vehicle 120 or the server 130, this is not meant to be limiting. The operations performed by the vehicle 120 and the server 130 as described herein can be performed by either entity. For example, certain operations normally performed by the server 130 (e.g., transmitting updating map data to the vehicles 170A-N) may be performed by the vehicle 120 for load balancing purposes (e.g., to reduce the processing load of the server 130, to take advantage of spare processing capacity on the vehicle 120, etc.).

Furthermore, any of the vehicles 170A-N may include some or all of the components of the vehicle 120 described herein. For example, a vehicle 170A-N can include a communications array 122 to communicate with the vehicle 120 and/or the server 130.

Machine Learning Based Lane Marking System

As previously described, the use of lane markings facilitates or improves various functions or features performed by on-board data processing systems, such as the data processing system 123. The lane markings may be included as part of and/or generated from maps or images of maps, such as those that may be stored at the map data repository 154. These lane markings may be determined or generated using a machine learning model. The machine learning model may be generated based on training data that includes images of roads with lane markings. Further, the machine learning model may be improved and/or generated using a reduced set of training data by pre-processing the training data to normalize the images of roads. Normalizing the images of the roads may include cropping the images to reduce the amount of background data or pixels unrelated to the road. Further, normalizing the images may include rotating each of the images so that the depicted roads within the images are aligned with a target axis. This target axis may be the horizontal axis.

In certain embodiments, the lane markings included on the images may not be identifiable or usable by certain processing units, or the amount of computing resources used to identify the lane markings is such that the lanes cannot be identified in real-time. For example, a vehicle routing system, a driver-assist system, or an autonomous vehicle system may not identify lane markings from an image or not identify the lane markings sufficiently fast enough to enable vehicle routing or autonomous driving. Moreover, a vehicle routing system, a driver-assist system, or an autonomous vehicle system may be configured to process data formats other than images in determining routing or in performing autonomous driving functions. However, often the mapping information is obtained from map images. Thus, it is desirable to identify lane markings within the images and to modify or otherwise annotate the images in a way that can be processed by a particular processing unit, such as a vehicle routing system, a driver-assist system, or an autonomous vehicle system. Embodiments of systems disclosed herein are capable of pre-processing images to identify lane markings within the images. The systems can then apply labels or markings to identify the location of lane markings within the images to facilitate various navigational and/or autonomous driving processes.

To simplify discussion, many of the examples discussed herein and much of the disclosure describes aligning the depicted roads with a horizontal axis. However, it should be understood that the target axis can be any axis with which the images of roads are aligned. For example, the target axis may be a vertical axis or an axis of 30°, 45°, 195° or any other axis of rotation. Further, to simplify discussion, much of the discussion herein relates to identifying lane markings on roads. However, embodiments disclosed herein can be applied to identifying markings or other annotations of other elongated objects. For example, embodiments disclosed herein can be applied to railroads, sidewalks, painted road stop or yield lines, or building layouts.

In certain embodiments, the lane markings may be applied to images or maps to create annotated images or maps that are annotated or otherwise modified or updated with lane markings or lane marking data. These annotated or modified images or maps may be used by a vehicle routing system, a driver-assist system, or an autonomous vehicle system. For instance, the annotated maps may be used by the navigation unit 140, the mapping engine 128, or the data processing system 123 to generate a navigation route or to facilitate autonomous or semi-autonomous driving.

Figure 2A:
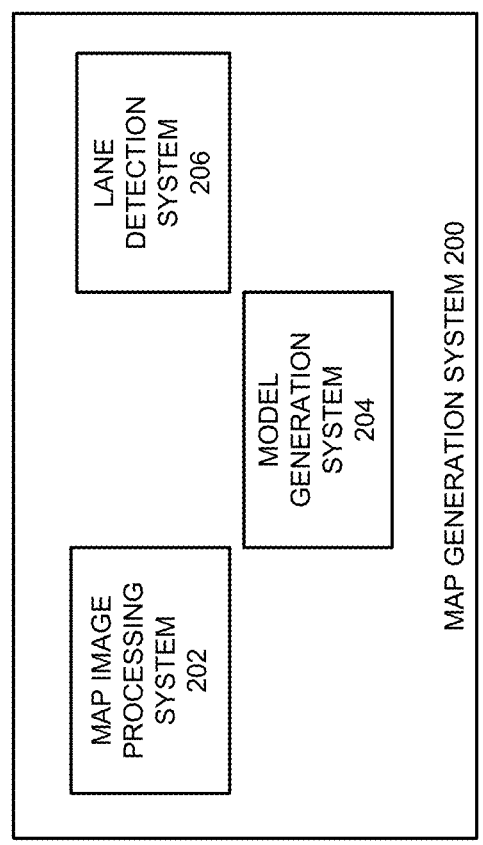
FIG. 2A illustrates a block diagram of a map generation system in accordance with certain embodiments.

In certain embodiments, the images or maps with the lane markings may be generated by a map generation system. FIG. 2A illustrates a block diagram of a map generation system 200 in accordance with certain embodiments. The map generation system 200 can include any system that can generate a map or an image with lane markings. Further, the map generation system 200 can pre-process images to reduce the amount of overhead and computing resources used to identify lane markings within the images and to annotate the images with lane markings in a form that can be processed by a secondary system such as a vehicle routing system, a driver-assist system, or an autonomous vehicle system. In some embodiments, the map generation system 200 may include any type of computing device(s), such as desktops, laptops, servers, network or cloud-computing devices, car-console devices, computerized appliances, wearable devices (for example, smart watches and glasses with computing functionality), and wireless mobile devices (for example, smart phones, PDAs, tablets, or the like), to name a few.

The map generation system 200 can include a number of systems or sub-system that can facilitate pre-processing images of maps or of road networks. Further, the systems may facilitate generating machine learning models, such as parameter or prediction models, that may be used to identify lanes within an image. The map generation system 200 can include a map image processing system 202, a model generation system 204, and a lane detection system 206. The map generation system 200 may include more or fewer systems. Further, one or more systems of the map generation system 200 may be implemented separately from the map generation system 200.

The map image processing system 202 can include any system that can receive a map or an image and can pre-process the map or image to facilitate identification of lane markings within the map or image. In some embodiments, the map image processing system 202 can pre-process maps or images to use as training data for a model generation system to generation a machine learning model. The pre-processed maps or images may include portions of larger maps or images. For example, the map image processing system 202 can divide a map into segments to facilitate processing. The segments may be equal or unequal in size. Further, the segments may be determined based on content within the image segment, such as a portion of a road in a road network.

The map image processing system 202 may pre-process a map or image by dividing the image into a number of segments that include a straight or substantially straight portion of a road. Further, the map image processing system 202 can identify the road within the image segment and can rotate the image segment so as to align the road with a desired target axis. Advantageously, in certain embodiments, by aligning the road segments with a desired target axis, the amount of training data, and therefore the amount of computing resources (e.g., processor usage, memory usage, cache usage, network bandwidth usage, etc.), used to generate a machine learning model can be reduced. Further, the accuracy of the machine learning model can be increased.

The model generation system 204 can include any machine learning system that can generate one or more machine learning models for identifying lane markings within an image. Further, the model generation system 204 can obtain or use pre-processed images as training data. The use of pre-processed images can reduce the amount of training data required to generate a machine learning model while maintaining or increasing the accuracy of the machine learning model generated by the model generation system 204.

The model generation system 204 can use one or more machine learning algorithms to generate one or more machine learning models, prediction models, or parameter functions. One or more of these machine learning models may be used to determine an expected value or occurrence based on a set of inputs. For example, a machine learning model can be used to determine a lane location or a probability that a portion of an image includes a lane marking, or a lane marking of a particular type (e.g., double-line, solid-line, dashed line, etc.) based on one or more inputs to the prediction model, such as, for example, training data that includes pre-marked or pre-labeled lane marking information. In some cases, the machine learning model may be termed a prediction model because, for example, the output may be or may be related to a prediction or a probability that an identified location or an identified set of pixels of an image contain content corresponding to a particular object, such as a lane marking. A number of different types of algorithms may be used by the model generation system 204 to facilitate generating the machine learning models 260. For example, certain embodiments herein may use a logistical regression model. However, other models are possible, such as a linear regression model, a discrete choice model, or a generalized linear model.

The machine learning algorithms can be configured to adaptively develop and update the models over time based on new input received by the model generation system 204. For example, the models can be regenerated on a periodic basis as new training data is available to help keep the predictions in the model more accurate. The model generation system 204 is described in more detail herein. After a model is generated, it can be provided to the lane detection system 206 to facilitate automatically identifying lane markings in additional images without user input or guidance in the lane marking identification process.

Some non-limiting examples of machine learning algorithms that can be used to generate and update the machine learning models, parameter functions, or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

The lane detection system 206 can include any system that can input or apply an image to a machine learning model to automatically identify, or identify without user input, lane markings within an image. Further, the lane detection system 206 can include any system that can label or otherwise mark the identified lane markings within the image. By labelling the lanes within the image, a routing or navigation system (e.g., a vehicle routing system, a driver-assist system, an autonomous vehicle system, or other processing system) can identify lanes without separately processing the images to identify the lanes within the image.

In certain embodiments, the server 130 may include the map generation system 200. Further, in some implementations, the vehicle data processing unit 145 may include the map generation system 200, or functionality thereof. The map generation system 200 may be implemented in hardware, software, or a combination of hardware and software. Further, the map generation system 200 may be a single computing system or a distributed computing system. In other embodiments, the map generation system 200 may be implemented by an application running on a user device 102 and/or another computing system separate from the server 130 or a user device 102.

Example Model Generation System

Figure 2B:
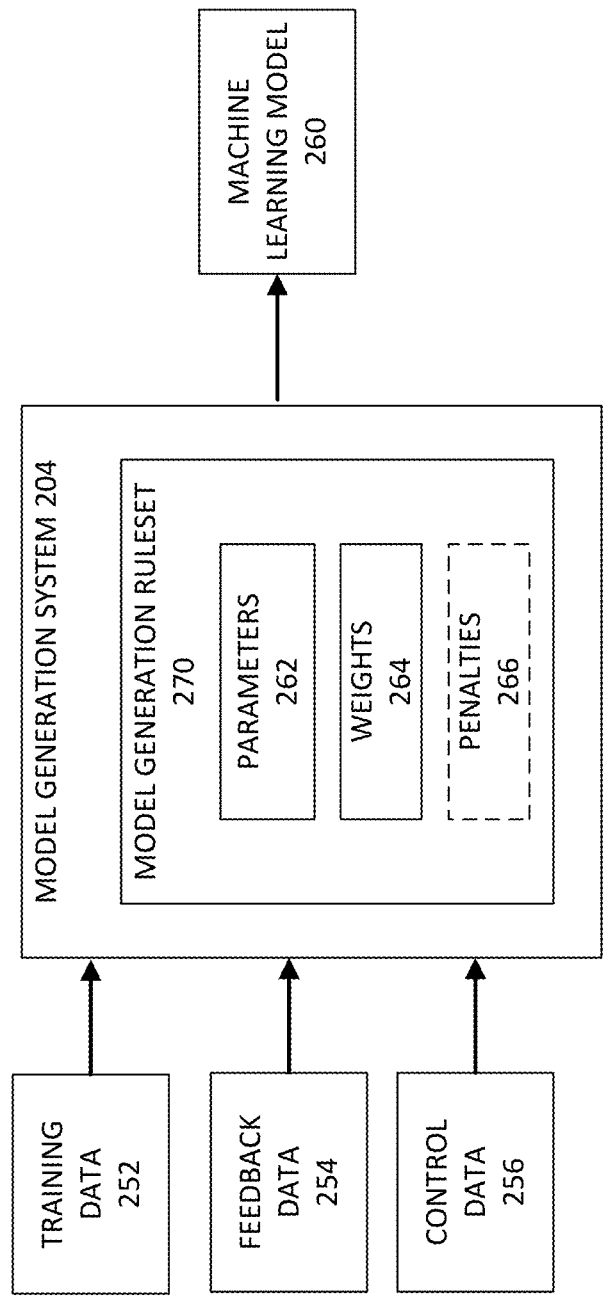
FIG. 2B illustrates an embodiment of a model generation system of FIG. 2A.

FIG. 2B illustrates an embodiment of a model generation system 204 of FIG. 2A. The model generation system 204 may be used to generate or determine one or more machine learning models 260 based on training data 252. The training data 252 may be historical data associated with previously processed images and/or may be generated training data. The training data may be generated by a user and/or by the map image processing system 202. Typically, although not necessarily, the training data 252 includes data associated with a large number of pre-processed images, such as hundreds, thousands, hundreds of thousands, or more, images. However, the present disclosure enables a reduction in the amount of training data using a pre-processing system and process on the images that enables a reduction in one or more orders of magnitude in the amount of training data 252 applied to the model generation system 204 without reducing the accuracy of the subsequently generated machine learning model 260. Further, the training data 252 can include data received from one or more data sources, such as, images previously processed by a machine learning model and images manually processed by a user. Moreover, the training data 252 can include data or images from different data sources, different data types, and any data generated by one or more sensors, such as the sensor array 121 or a LiDAR system. In some cases, the training data 252 may be accessed from a repository, such as the data store 150.

The model generation system 204 may, in some cases, also receive feedback data 254. This data may be received as part of a supervised model generation process that enables a system user, such as an administrator, to provide additional input to the model generation system 204 that may be used to facilitate generation of the machine learning model 260. For example, if an anomaly exists in the training data 252, the system user may tag the anomalous data enabling the model generation system 204 to handle the tagged data differently, such as applying a different weight to the data or excluding the data from the model generation process.

Further, the model generation system 204 may receive control data 256. This control data 256 may identify one or more features or characteristics for which the model generation system 204 is to determine a model. Further, in some cases, the control data 256 may indicate a value for the one or more features identified in the control data 256. For example, suppose the control data 256 indicates that a machine learning model is to be generated using the training data 252 to determine marked lanes, and in some cases unmarked lanes, in an image of a road network. The control data 256 may include manually marked lanes in the training data 252. This control data 256 may be provided as a separate metadata or layer of data, or may be included as part of the training data 252.

The model generation system 204 may generally include a model generation rule set 270 for generation of the machine learning model 260. The rule set 270 may include one or more parameters 262. Each set of parameters 262 may be combined using one or more mathematical functions to obtain a parameter function, which may be or may not be used to create the machine learning model 260. Further, one or more specific parameters may be weighted by the weights 264. In some cases, the parameter function may be obtained by combining a set of parameters with a respective set of weights 264. The machine learning model 260 and/or the respective parameters 262 of the machine learning models 260 may be derived during a training process based on particular input data, such as the training data 252, feedback data 254, and control data 256, as well as defined output criteria, which may be included with the control data 256, used for training purposes. The model generation rule set 270 can define the specific machine learning rules and/or algorithms the model generation system 204 uses to generate the model based on a defined objective function, such as determining lane markings or other guidance marks (such as arrows, stop or yield lines, or speed limits painted on the roads). In some embodiments, initial parameters 262 and weights 264 can be manually provided during the initiation of the model generation process. The parameters 262 and weights 264 can be updated and modified during the model generation phase to generate the prediction model 260.

The model generation system 204 can filter and categorize the training data sets according to various characteristics and parameters of the data. For example, the data can be categorized by the data source (e.g., images from a user or images generated by other automated systems), information type (such as, images with lane markings, images without lane markings, images with particular types of lane markings, and the like), or other categories that may be associated with the training data. The model generation system 204 can filter the information to identify the information for further processing. In some embodiments, the model generation system 204 is configured to filter and separate the training data 252 into a plurality of data types or categories before further processing. Moreover, in some cases, some of the training data 252 may be filtered out or removed from the training data 252 based on the data being associated with a relevance that does not satisfy a threshold relevance as determined by the model generation system 204.

Optionally, one or more of the prediction models 260 may be associated with a penalty 266. These penalties 266 may be used to facilitate the generation of or selection of a particular machine learning model 260 based on one or more factors that are used to derive the penalty. For example, the mathematical complexity or the number of parameters included in a particular machine learning model 260 may be used to generate a penalty for the particular machine learning model 260, which may impact the generation of the model and/or a selection algorithm or a selection probability that the particular machine learning model 260 is selected. After the machine learning model 260 has been generated, the model can be used during runtime of the lane detection system 206 to determine lane markings in images.

Example Road Extraction and Normalization Process

Figure 3:
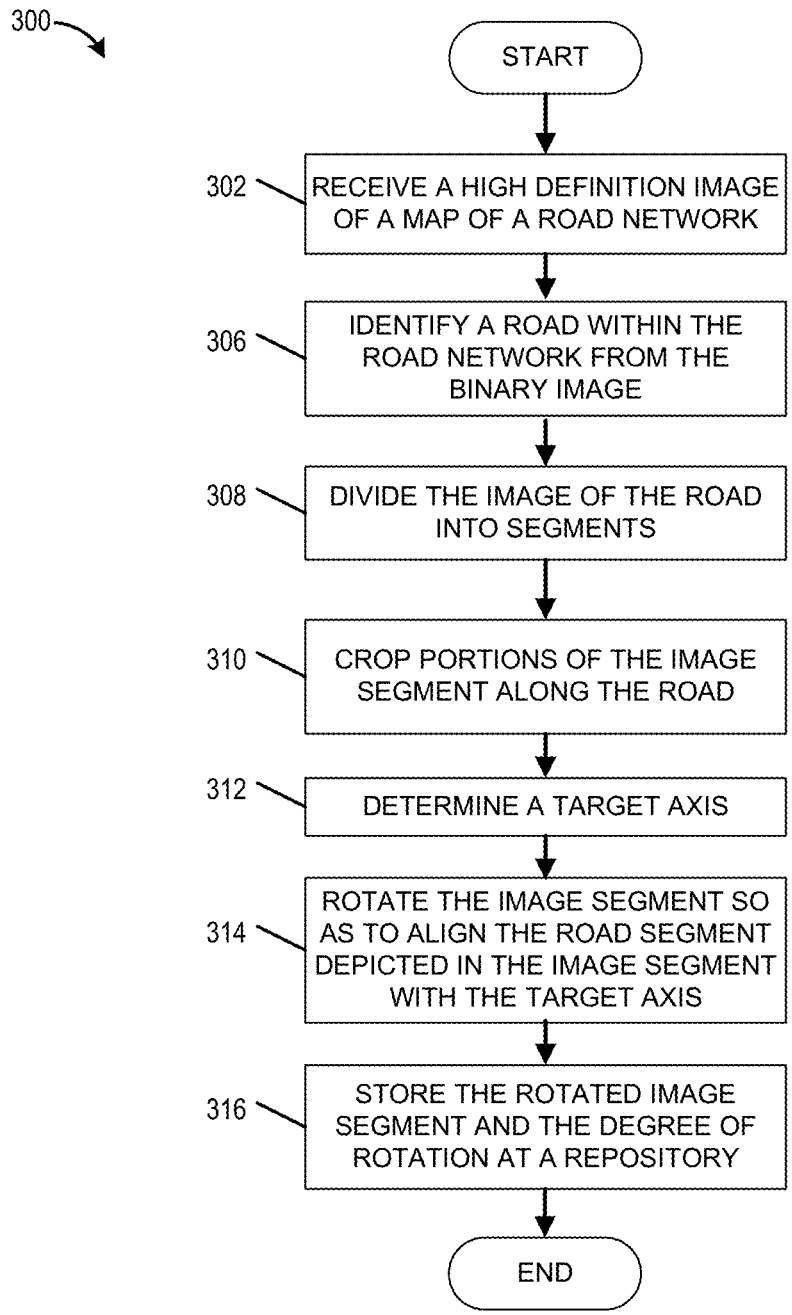
FIG. 3 presents a flowchart of an example road extraction and normalization process in accordance with certain embodiments.

FIG. 3 presents a flowchart of an example road extraction and normalization process 300 in accordance with certain embodiments. The process 300 can be implemented by any system that can pre-process an image by identifying a road within the image and normalizing the portion of the image that includes the road by rotating the portion of the image of the road to align with an identified target axis. The process 300, in whole or in part, can be implemented by, for example, a vehicle data processing unit 145, a map generation system 200, a map image processing system 202, a model generation system 204, or a lane detection system 206, among others. Although any number of systems, in whole or in part, can implement the process 300, to simplify discussion, the process 300 will be described with respect to particular systems.

In certain embodiments, the process 300 can be used as part of a pre-processing method for generating training data for the model generation system 204. Alternatively, or in addition, the process 300 may be used to pre-process images to facilitate editing a map or image with lane markings or labels of lane markings, or other desirable features to label within an image.

The process 300 begins at block 302 where, for example, the map image processing system 202 receives a high definition (HD) image of a map of a road network. The resolution of the HD image may be 10 cm. For example, the HD image may be a satellite image with a 10 cm-per-pixel resolution. The resolution of a high definition image may vary. However, often, a high definition image is an image that has a resolution that is at least 1280×720 pixels. Although embodiments described herein are with respect to an image that has a resolution that qualifies as an HD image, in certain embodiments, embodiments disclosed herein may be used with images of a lower resolution. In certain embodiments, the image of the map may be of less or greater resolution than a high definition image. Further, in certain embodiments, the high definition map may be generated from sensors, such as LiDAR sensors, radar sensors, infrared cameras, visible light cameras, stereo cameras, IMU, and the like. Alternatively, or in addition, the HD image or map can be generated from satellite imagery, or images generated by other imaging systems.

Although the HD image received at the block 302 depicts a road network, in certain embodiments the image may depict other features that may be found near road networks. For example, the HD image may depict flora (e.g., grass, bushes, trees, etc.), fauna (e.g., dogs, cats, birds, deer, etc.), buildings or other structures, signs, sound barriers, road-median structures, and the like. Further, as previously described, embodiments disclosed herein may be applied to structures or networks other than road networks, and can include any type of relatively elongate structure that may have markings or other features that are desirable to mark within the image. As such, the image may depict other networks, such as railroad networks, waterways, walking paths (e.g., sidewalks or hiking paths), or building layouts, and the like.

Optionally, the map image processing system 202 converts the HD image into a binary image. Converting the HD image into a binary image may include converting the image into a black-and-white image (also sometimes referred to as a monochrome or monochromatic image) or other two-color image. In certain embodiments, the binary image may include grayscale images whose pixels are limited to one sample per pixel. As the binary image often includes only two possible values for each pixel, in some cases, a number of features depicted within the image may be erased or no longer depicted. Further, in some cases, some features depicted within the image may remain depicted, but may be less discernible compared to the original HD image. In certain embodiments, the conversion of the HD image into the binary image may be such that a road is emphasized within the image compared to other features of the image. In certain embodiments, converting the image to a binary image can facilitate obtaining an estimate of a shape of a road or road network included in the image, because, for example, most of the non-road pixels may be empty or associated with a value or color designated as empty or non-containing image data. The empty pixels may occur, for example, because the non-road areas may be un-scanned by the sensors used to generate the image.

Figure 8A:
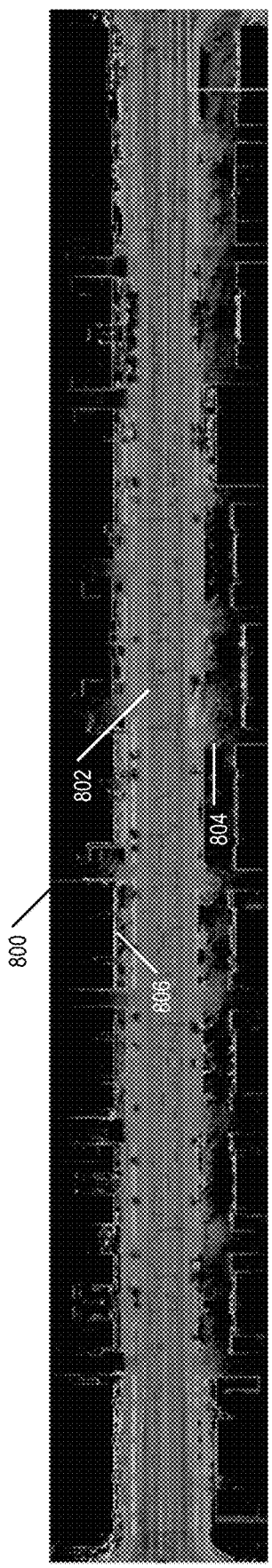
FIGS. 8A and 8B illustrate examples of an image segment pre-processed in accordance with certain embodiments to identify lane markings within the image illustrated in FIG. 8C.

In certain embodiments, the processes disclosed herein may be performed using grayscale images instead of or in addition to using binary images. Accordingly, in certain embodiments, the HD image may be converted to a grayscale image. In other embodiments, the HD image is generated as or received as a grayscale image. In such embodiments, a grayscale conversion process may be omitted. As some or all of the features described herein can be performed on grayscale images, in certain embodiments, converting the HD image to a binary image may be omitted or optional. One example of a grayscale image is in FIG. 8A. As can be seen in FIG. 8A, the road 802 and some flora 804 bordering the road 802 are visible within the image. Further, some portions of buildings 806 are also visible within the image. However, most of the buildings and other additional features within the image are de-emphasized or not depicted within the grayscale image. In certain embodiments, pixels in the HD image that have color may be converted to white (or one color) and the remaining pixels may be converted to black, or another color. In other embodiments, pixels associated with a particular luminosity or set of colors may be converted to one color, and the remaining pixels may be converted to the other selected color in a binary image. In yet other embodiments, pixels with color may be converted to various forms of gray on a grayscale color palette.

At block 306, the map image processing system 202 identifies a road within the road network from or using the HD image, or a grayscale or binary image obtained from the HD image. The map image processing system 202 may identify the road in the image using contrast and gradient information obtained from the image. In some embodiments, the map image processing system 202 may select several points as key points along the contours of the road. The contours may be determined based on one of the colors in the image. For example, in the case of processing a grayscale or binary image, contours may be drawn, or identified, as surrounding pixels that are white.

Further, the map image processing system 202 may identify inflection points that have larger gradients (e.g., color gradients greater than a threshold difference, such as greater than 50, 100, etc.) within the image. These points or sections that have larger gradients may be determined to be the starting and/or endpoints of a road depicted within the image. Accordingly, the road may be identified or otherwise extracted from the image based on the starting and endpoints of the road within the image. In some embodiments, multiple roads may be identified or depicted within the image.

At block 308, the map image processing system 202 divides the image of the road into segments or image segments. Dividing the image into segments may include dividing the HD image into segments. In some embodiments, the image that is divided is the binary or grayscale image. In other embodiments, the map image processing system 202 divides the HD image using the binary or grayscale image as a reference to identify the segments. In other words, the map image processing system 202 may identify the segments using the binary or grayscale image and then divide the HD image based on the identified segments. The image segments may all be the same size. However, often the image segments are differing sizes. In certain embodiments, the image may be divided into segments based on input by the user. In other embodiments, the image may be divided without input by the user. In some implementations, the image may be divided into segments automatically using, for example, a machine learning algorithm. Alternatively, or in addition, the image may be divided into segments using rules for distinguishing different portions of the road based at least in part on image recognition data. In some cases, the different segments of the image may be determined based at least in part on an identification of crossroads or other features that cross a road. Further, the different segments of the image may be determined based at least in part on contrast differences between portions of the image that include the road and portions of the image that do not include the road.

Figure 6:
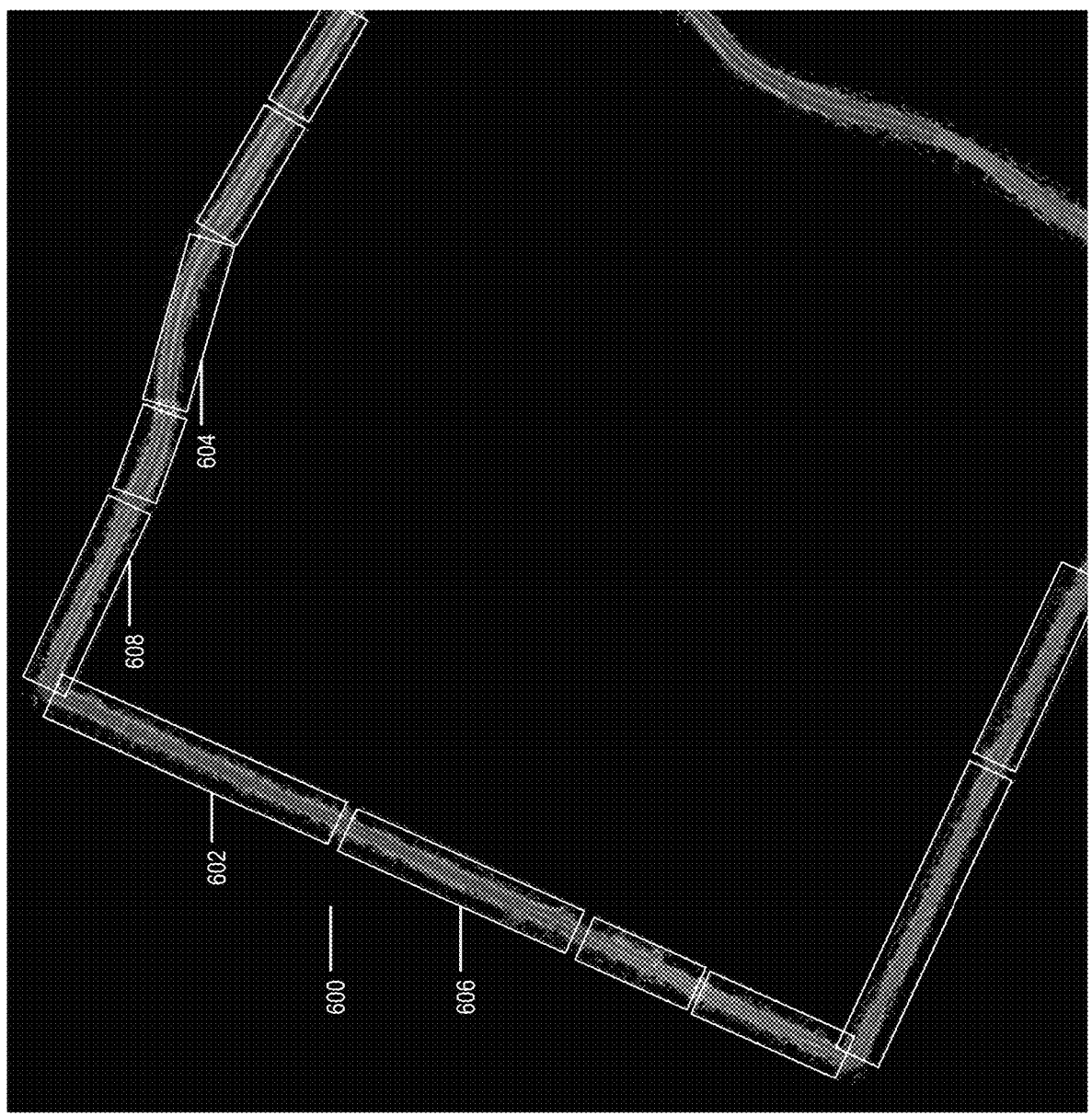
FIG. 6 illustrates an example image of a road network with segmentation annotations in accordance with certain embodiments.

The map image processing systems 202 may determine the segments in which to divide the image based on the curvature of the road. The straighter the road, the longer the selected image segment. The more curved the image road, the smaller the image segment. The size of the image segment may be selected to reduce the curvature of the road depicted within the image segment. Thus, each of the image segments may include a portion of road that is no more curved than a threshold degree or curvature. FIG. 6 illustrates an example image of a road network 600. It should be understood that the road network 600 may be a portion of a larger road network. Further, additional cross streets may exist in the road network, which have been omitted from FIG. 6 for ease of illustration. For instance, some or all of the gaps between segments 602, 604, and 606 may have omitted cross streets.

As illustrated, the image may be divided into segments that include portions of roads within the road network. The segments associated with straight portions of roads (e.g., segment 602) may be larger than segments associated with curved road portions (e.g., segment 604) so as to reduce the curvature within the particular segment. In some embodiments, the segment 604, which includes a curved road, may be broken into smaller segments to further reduce the amount of road curvature within a single segment. In some embodiments, the segments may be associated with or limited to a maximum size. For example, although the curvature of the road included in sequential segments 602 and 606 is relatively equal, the portion of the road is divided into two segments 602 and 606. In certain embodiments, by capping a size of the segments, the machine learning algorithm may be simplified and/or the computing resources required to perform the lane identification and marking may be reduced. In certain embodiments, the segments 602 and 606 may be combined as a single segment.

In certain embodiments, segments may be split based on the identification of cross streets, crosswalks, gutters, speed bumps, railroad tracks, or other features that may cross a road. In some embodiments, the segments are contiguous. In other embodiments, as illustrated in FIG. 6, a gap may be left between segments. The gap may identify a location of cross streets, crosswalks, gutters, speed bumps, railroad tracks, or other features that may cross a road. Alternatively, the gap may exist to facilitate the processing and re-combination of individual road segments.

At block 310, for each of or at least some of the image segments, the map image processing system 202 crops portions of the image segment along the road. Cropping portions of the image segment along the road may include removing at least some portions of the image segment that do not include the road segment. Further, cropping portions of the image segment that do not include the road segment may include omitting portions of the image that are at least a particular number of pixels away from an identified road within the road segment. In some embodiments, the image segments are cropped such that adjacent image segments preserve at least some overlapping information or pixels. Advantageously, in certain embodiments, by maintaining an overlapping buffer, the map image processing system 202 can ensure that information relating to the roads is not lost during the cropping process. In some embodiments, some image segments may be cropped while others may not be cropped. Further, the amount that each image segment is cropped may differ. For instance, an image segment that includes a greater portion of road may be cropped less than an image segment that includes more background material unless road. Further, whether the image segment is cropped or the amount of the image segment is cropped may depend on a confidence level that a portion of the road is not lost during the cropping process. For instance, if the map image processing system 202 determines with a 95% or higher degree of certainty (or any other threshold certainty level) that the portions cropped out of the image segment do not include road, the map image processing system 202 may crop the image segment. On the other hand, if the map image processing system 202 has less than a threshold degree of certainty confidence that the portions cropped of the image segment do not include road, the map image processing system 202 may omit the image segment from a cropping process, or from being cropped. In certain embodiments, the block 310 may be optional or omitted.

At block 312, the map image processing system 202 determines a target axis. The target axis may be a horizontal axis, a vertical axis, or any other axis. In some embodiments, the target axis is selected from within a two-dimensional plane. The target axis may be specified by the user or may be selected automatically using one or more algorithms. For example, the target axis may be selected based on a number or percentage of image segments that are aligned with the target axis or that are within a threshold degree of rotation from the target axis.

At block 314, the map image processing system 202 rotates each image segment so as to align the road segment depicted in the image segment with the target axis. For instance, the image segment 602 may be rotated such that the road included within the image segment 602 becomes horizontal, vertical, or aligns with any other selected target axis. Advantageously, in certain embodiments, rotating each image segment to align with the target axis reduces the amount of training data needed to train a machine learning algorithm or to generate a machine learning model while maintaining, or in some cases improving, a degree of accuracy of the machine learning model. In certain embodiments, the rotated images may be referred to as normalized images in that road segments depicted in each of the rotated images are aligned with the same target axis. In some embodiments, multiple target axes may be used. In some such cases, at least some of the image segments may be duplicated and rotated to align with different target axes.

At block 316, the map image processing system 202 stores the rotated image segment and the degree of rotation at a repository. This repository may be a repository of training data used by a machine learning process to generate a machine learning model or parameter model. In some cases, the repository may be the data store 150. For example, the rotated image segment and the degree of rotation may be stored as part of the map data 154. In some embodiments, the block 316 may be optional or omitted. For example, the rotated image segment and the degree of rotation of the image segment may be provided to model generation system 204 without storing the data at a repository.

If the rotated image segment is being used as part of training data, the process 300 further includes adding lane markings or labels to the rotated image segment to facilitate the generation of the machine learning model or parameter model. The machine learning model generation process is described in further detail below with respect to the process 400. On the other hand, if the rotated image segment is being used as input to a machine learning model or parameter model to identify lane markings to label, the rotated image segment may be provided to the machine learning model without the addition of the lane markings.

Example Machine Learning Model Generation Process

Figure 4:
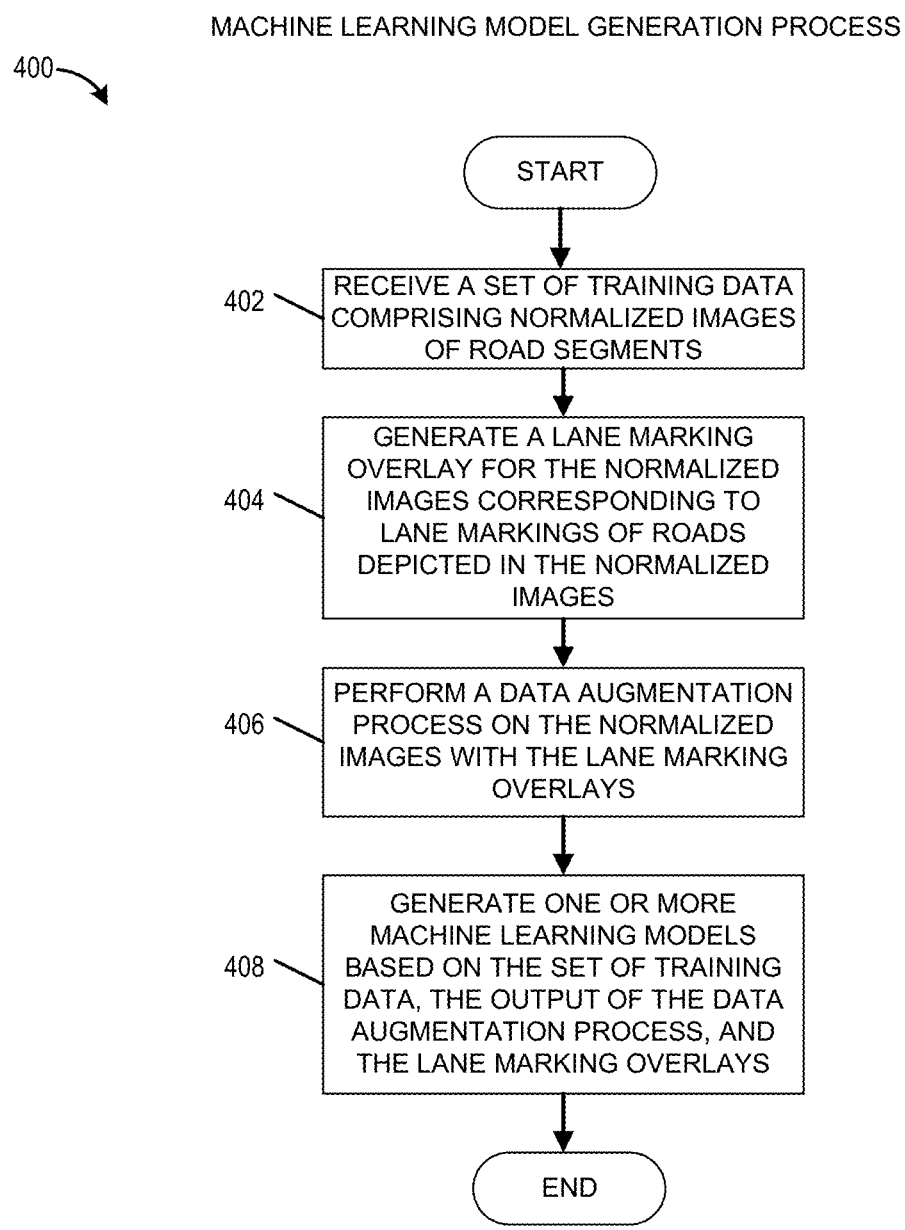
FIG. 4 presents a flowchart of an example machine learning model generation process in accordance with certain embodiments.

FIG. 4 presents a flowchart of an example machine learning model generation process 400 in accordance with certain embodiments. The process 400 can be implemented by any system that can generate a machine learning model using a reduced set of training data by using pre-processed images. The process 400, in whole or in part, can be implemented by, for example, a vehicle data processing unit 145, a map generation system 200, a map image processing system 202, a model generation system 204, or a lane detection system 206, among others. Although any number of systems, in whole or in part, can implement the process 400, to simplify discussion, the process 400 will be described with respect to particular systems.

The process 400 begins at block 402 where, for example, the model generation system 204 receives a set of training data comprising normalized images of road segments. The normalized images of the road segments may include images or image segments that are rotated to align a road depicted within the image segment with a particular target axis. For example, the normalized images may include images that are each rotated to align the depicted road segments with a horizontal axis. In certain embodiments, the set of training data may be received as an output from the process 300. Further, in some cases, the set of training data may be obtained from a repository, such as the repository 150.

At block 404, a lane marking overlay for the normalized images corresponding to lane markings of roads depicted in the normalized images may be generated. In certain embodiments, the lane marking overlay may be generated by a user or generated based at least in part by user input. For example, the user may identify locations within each normalized image that include or depict lane markings. Based on the user's identification of the location of lane markings within the image, the lane marking overlay layer may be created to identify the location of lane markings to the model generation system 204. In some embodiments a user may use a computing system, such as the map generation system 200, to generate the lane marking overlay. The lane markings provided at the block 404 may act as or be included in control data for the model generation system 204 to facilitate the generation of the machine learning models.

At block 406, the model generation system 204 performs a data augmentation process on the normalized images with the lane marking overlays. The data augmentation process may include creating one or more additional sets of images by rotating copies of at least some of the normalized images. The rotated copies of the normalized images may be rotated a random amount, a pseudorandom amount, or a particular fixed amount. Further, each of the rotated copies of the normalized images may be rotated the same amount or by differing amounts. Advantageously, in certain embodiments, the data augmentation process reduces or eliminates the overfit problem in generating a machine learning model.

The overfit problem may occur when the generated machine learning model is too accurate with respect to the training data or that models the training data too well. When the machine learning model is too accurate with respect to the training data or models the training data too well, the machine learning model may not be sufficiently general to process subsequent provided input data. For instance, the machine learning model may learn noise or random fluctuations in the training data as concepts to be modeled. An overly accurate machine learning model can be problematic because new data may not include some of the noise or random fluctuations and as a result may be processed less accurately compared to a machine learning model, or in some cases may fail to process the new data.

One solution to the overfit problem is to provide additional training data. However, as previously described, the greater the amount of training data, the greater burden on computing resources, and in some cases human resources that may be required to prepare or manually process (e.g., such as manually labeling lane markings) the training data before it is provided to the model generation system. Advantageously, in certain embodiments, the use of a data augmentation process enables the model generation system 204 to reduce or eliminate the overfit problem by using a reduced set of training data as described herein.

At block 408, model generation system 204 generates one or more machine learning models based on the set of training data, the output of the data augmentation process, and the lane marking overlays. The one or more machine learning models may be parameter or prediction models. When input data, such as images of roads, are provided to the one or more machine learning models, the one or more machine learning models may output annotated images of the roads and/or location information that identifies where lane markings exist within the images. Further, in certain embodiments, the one or more machine learning models may output the type of lane markings. For example, the machine learning models may output whether the lane markings are solid lines, dashed lines, double lines, yellow lines, white lines, arrows, and the like. In some cases, the output of the machine learning models may include a likelihood associated with some or all of the points (e.g., pixels or groups of pixels) within the image indicating the likelihood that the points include a lane marking. Based at least in part on the likelihood that the particular points include a lane marking, a lane detection system 206 may label or otherwise mark corresponding locations on the images to indicate the location of the lane markings and/or the type of lane markings. In some embodiments, the images themselves may not be marked with the labels or lane markings. In some such embodiments, data may be stored associated with the images that indicate a location and/or type of lane markings to a vehicle data processing unit 145, a navigation unit 140, mapping engine 128, a vehicle control system 126, a data processing system 123, or any other route navigation or autonomous driving system.

In certain embodiments, a weight or penalty may be associated with each machine learning model or parameter model generated by the model generation system 204. The weight or penalty associated with each machine learning model may be based at least in part on an accuracy of the machine learning model, the complexity of the machine learning model, a relative amount of computing resources required to execute the machine learning model, or any other factor that may affect the selection or execution of the machine learning model. Based at least in part on the weight or penalties associated with each machine learning model, the model generation system 204 may select one or a subset of the generated machine learning models to store or use for a lane marking process, such as the process 500 described below.

Example Automated Lane Marking Process

Figure 5:
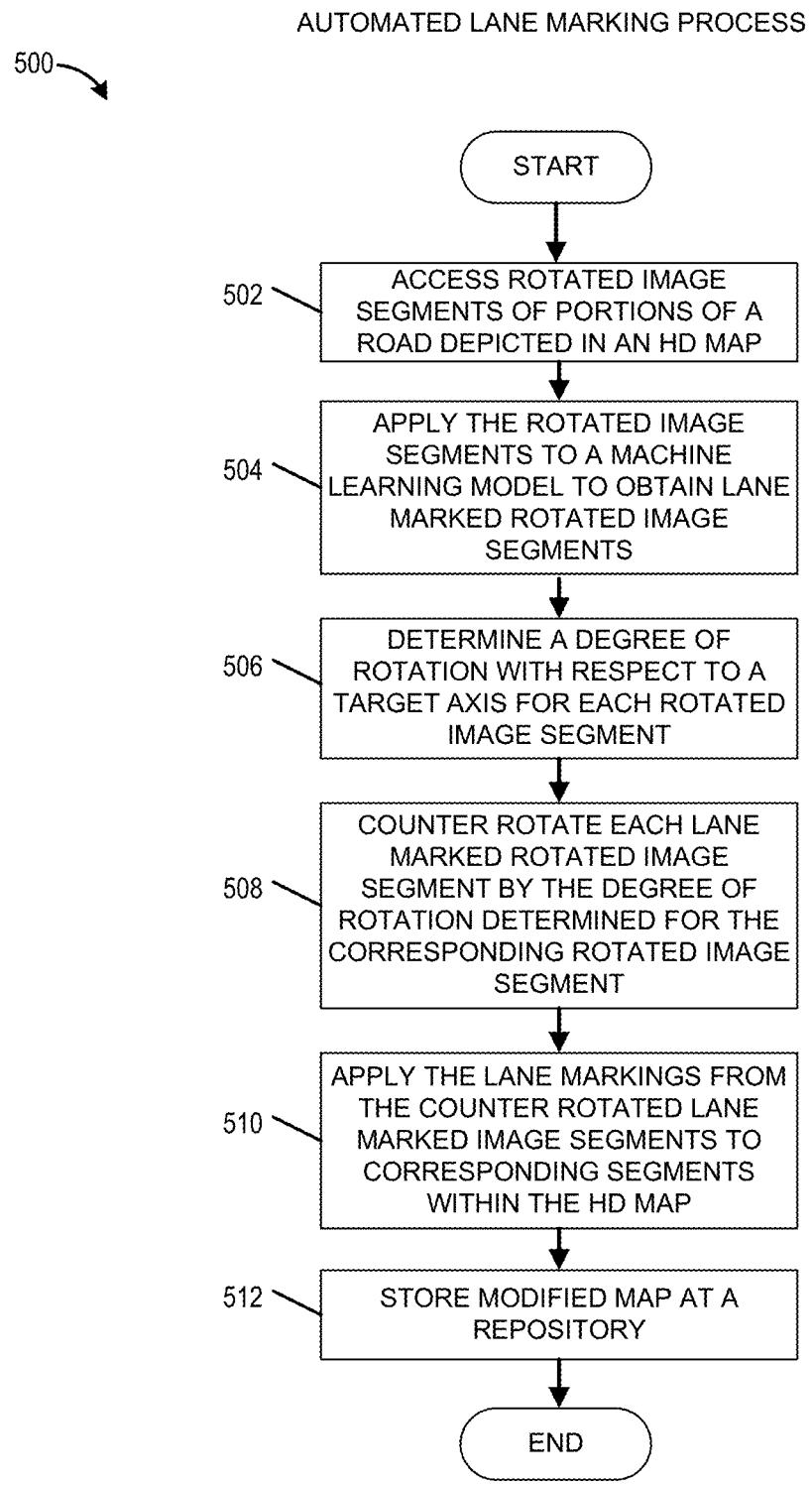
FIG. 5 presents a flowchart of an example automated lane marking process in accordance with certain embodiments.

FIG. 5 presents a flowchart of an example automated lane marking process 500 in accordance with certain embodiments. The process 500 can be implemented by any system that can automatically mark or label a lane within an image without user input. The process 500, in whole or in part, can be implemented by, for example, a vehicle data processing unit 145, a map generation system 200, a map image processing system 202, a model generation system 204, or a lane detection system 206, among others. Although any number of systems, in whole or in part, can implement the process 500, to simplify discussion, the process 500 will be described with respect to particular systems.

The process 500 begins at block 502 where, for example, the lane detection system 206 accesses one or more rotated image segments of portions of a road depicted in an HD map. In certain embodiments, the rotated image segments may be accessed from a repository, such as the data store 150. Further, in certain embodiments, the rotated image segments may be obtained using the process 300 previously described above. In certain embodiments, the block 502 may include one or more of the embodiments previously described with respect to the block 402.

At block 504, the lane detection system 206 applies the rotated image segments as input to a machine learning model to obtain lane-marked rotated image segments. These lane-marked rotated image segments may include rotated image segments with labels that identify where lane markings are within the image. These labels may be added to the rotated image segments or may be part of an overlay layer is associated with the rotated image segments.

Alternatively, or in addition, the block 504 may include obtaining data indicating where lane markings exist within the rotated image segments. For instance, as described above, the machine learning model may output a likelihood that each pixel or group of pixels within the image segment contains a lane marking or a portion of a lane marking. In some cases, the probability or confidence that a group of pixels includes a lane marking may be increased if surrounding groups of pixels are also determined with a threshold degree or probability to include a lane marking. For example, if it is determined that a particular group of pixels likely includes a lane marking, there is an increased possibility that a neighboring group of pixels may include a lane marking as it is likely that the lane marking extends to multiple groups of pixels. Further, as previously described, in certain embodiments, the use of the rotated image segments enables the machine learning model to more accurately identify the lane markings by using reduced computing resources.

At block 506, the lane detection system 206 determines a degree of rotation with respect to a target axis for each rotated image segment. The degree of rotation may be determined from data stored at a repository with the rotated image segment. Alternatively, the degree of rotation may be metadata that is inserted into the rotated image segment or into a media file that includes the rotated image segment. In some embodiments, the rotated image segment may be annotated with the degree of rotation that the original segment was rotated to obtain the rotated image segment. In such cases, the lane detection system 206 may determine the degree of rotation from the annotation.

At block 508, the lane detection system 206 counter rotates each lane marked rotated image segment by the degree of rotation determined for the corresponding rotated image segment. In certain embodiments, counter rotating the lane marked rotated image segment comprises rotating the lane marked rotated image segment in the opposite direction and by the same degree that an image segment was rotated to obtain the rotated image segment. Once the rotated image segment is counter rotated, the resulting image segment should match or substantially match the original image segment from which the rotated image segment was derived. Thus, in certain embodiments, the portion of the road depicted in the resulting image segment may match the original alignment of the portion of the road in the map that was originally received at, for example, the block 302.

At block 510, the lane detection system 206 applies the lane markings from the counter rotated lane-marked image segments to corresponding segments within the HD map. Applying the lane markings to the corresponding segments within the HD map may include replacing the corresponding portion of the HD map with the counter rotated lane-marked image segment. Alternatively, applying the lane markings to the corresponding segments within the HD map may include marking or annotating the HD map with lane markings and/or labels based on a location of the lane markings were labels within the counter rotated lane marked image segments. In some embodiments, the block 510 may include storing data or metadata with the HD map that identifies the location of lane markings as determined based at least in part on the counter rotated lane marked image segments.

At block 512, the lane detection system 206 stores the modified map at a repository, such as the data store 150 and/or the data store 129. The modified map may be included in the map data 154 of the data store 150. The modified map may be used by a vehicle or navigation processing system, such as a vehicle routing system, a driver-assist system, or an autonomous vehicle system, to facilitate identifying lanes within a route, changing from one lane to another lane, and/or to maintaining a vehicle within a lane.

Example Images

FIGS. 6-10 illustrate several example images in accordance with certain embodiments described herein, including the previously described processes 300,400, and 500. As previously described, FIG. 6 illustrates an example image of a road network with segmentation annotations in accordance with certain embodiments. This road network may be part of a larger road network. Further, the image segments, identified by the white bounding boxes may be identified using any of the processes described herein, including the process 300 and the operations associated with the block 308. As illustrated, for example, by the segments 602 and 608, some of the segments may be overlapping. Further, as previously described, portions of the image depicting curved roads may be broken into smaller segments to reduce the curvature of the depicted roads. For ease of illustration, the curved segment 604 is relatively large. It should be understood that the segment 604 may be divided into smaller segments to reduce the amount of road curvature illustrated in any one segment.

Figure 7:
FIG. 7 illustrates a zoomed in portion of the example image of FIG. 6.

FIG. 7 illustrates a zoomed in portion of the example image of FIG. 6. As can be seen more clearly in FIG. 7, the segments may be separated at particular sections to reduce the curvature of road depicted in a single segment as illustrated by gap 702. Further, as illustrated by gap 704, the segments may be divided by the existence of a cross street or crosswalk.

Figure 8B:
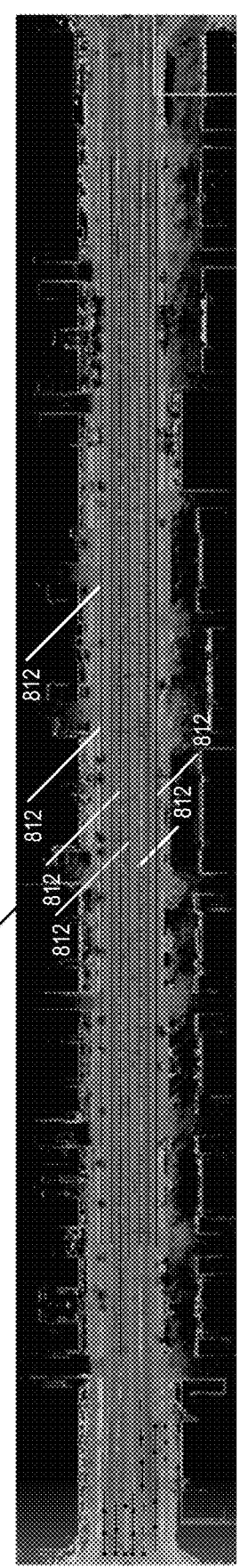
Figure 8C:
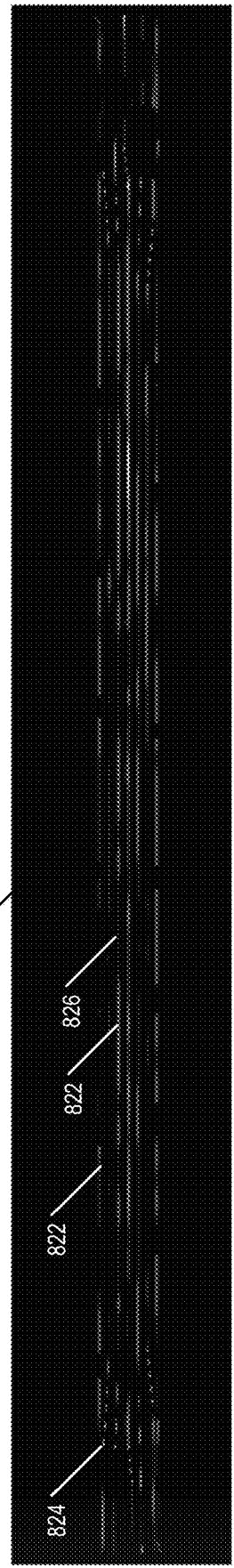

FIGS. 8A and 8B illustrate examples of an image segment pre-processed in accordance with certain embodiments to identify lane markings within the image illustrated in FIG. 8C. FIG. 8A illustrates an example of an image segment 800, that can be obtained from, for example, an image of a road network 600. Although the image of the road network 600 does not include any roads aligned with a horizontal axis, the image segment 800 has been rotated to be horizontal as part of, for example, the process 300. The image segment 800 may be rotated using one or more of the operations described with respect to the block 314.

Further, the image segment 800 may be cropped to reduce the amount of background pixels included in the image segment. As previously described, gradient and/or contrast information may be used to automatically crop the image, or a binary or grayscale image of the road, and to focus the road within the foreground of the image. The cropping typically occurs prior to rotation to more accurately identify the road and align it with the target axis. However, in certain embodiments, the rotation may occur first or substantially in parallel with the cropping process. As previously described, the image segment 800 may depict a road 802 along with bordering objects, such as flora 804 and buildings 806. In certain optional embodiments, the additional objects are de-emphasized by the map image processing system 202 via a binary or grayscale image conversion process and/or the cropping process.

FIG. 8B illustrates an image segment 810. The image segment 810 corresponds to the image segment 800, but includes lane markings or labels 812 marking or identifying the lane markings included in the image segment from the original image. A user may interact with the map generation system 200 to annotate or add the lane markings 812 to the image segment to facilitate preparing training data for the model generation system 204. The lane markings or labels may be applied using one or more of the operations described with respect to the block 404. The image segment 810 with the lane markings may be supplied to the model generation system 204 as training data.

FIG. 8C illustrates an image segment 820 generated using embodiments disclosed herein. Similar to the image segment 810, the image segment 820 corresponds to the image segment 800. However, the image segment 820 is processed by a machine learning model generated by the model generation system 204. The image segment 820 includes a mask or overlay identifying the lane markings for the road 802. As illustrated in FIG. 8C, the mask or overlay with the lane markings, or labels, generated by the machine learning model using embodiments disclosed here is substantially accurate compared to the original image segment 800. The lane markings include the solid line lane markings 822 as well as the dashed line markings 824. In certain embodiments, the lane markings or labels may have different intensities, or brightness, corresponding to the confidence level or the probability that a lane marking exists where identified by the machine learning model. This confidence level is illustrated by the mask or lane marking overlay depicted in FIG. 8C by the darker lane markings 822 and the lighter lane markings 826. The lane markings 822 and 824 may be applied by the lane detection system 206 to an image segment or image that includes the image segment using, for example, the process 500. For example, the operations of the block 510 may be used to apply the labels from the mask illustrated in FIG. 8C to the image segment 800 in FIG. 8A.

Figure 9A:
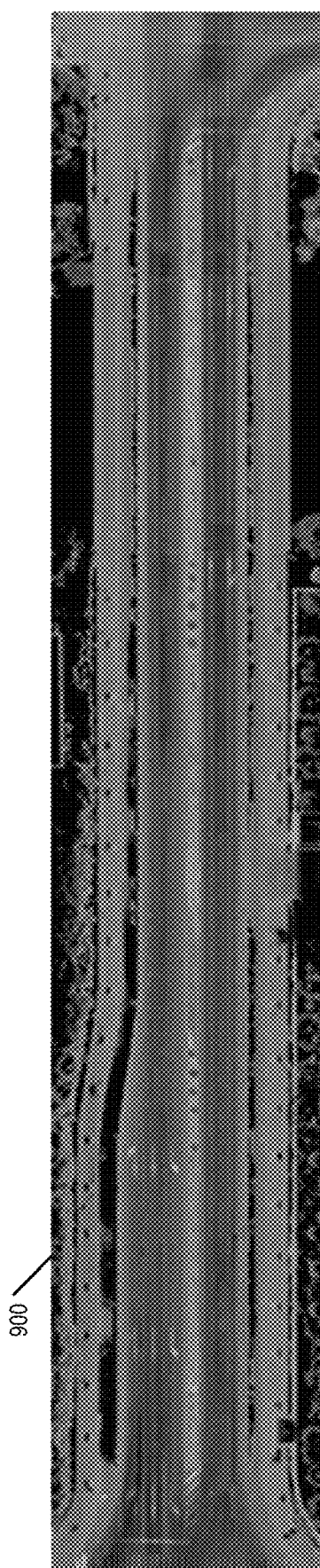
FIGS. 9A and 9B illustrate additional examples of pre-processed image segments depicting a road segment in accordance with certain embodiments.
Figure 9B:
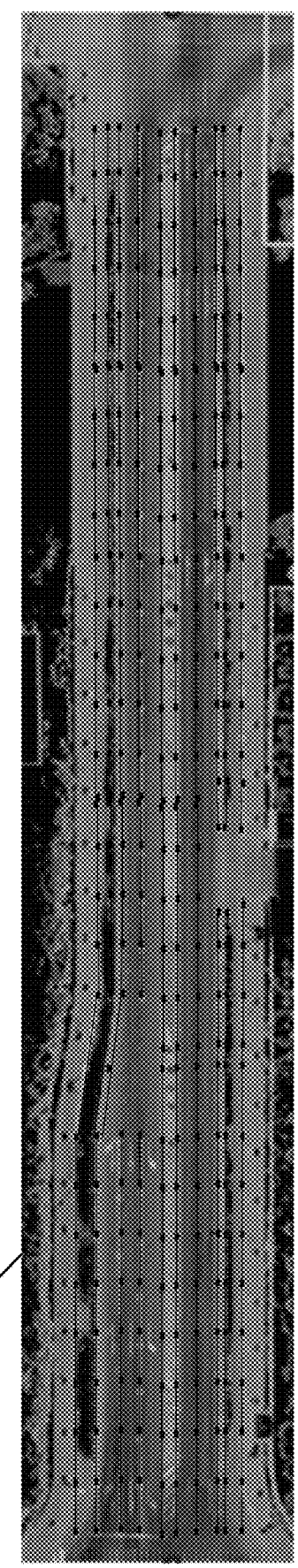

FIGS. 9A and 9B illustrate additional examples of pre-processed image segments depicting a road segment in accordance with certain embodiments. FIG. 9A illustrates an image segment 900 of a portion of a road. The image segment 900, as with the image segment 800, has been rotated from its original axis to align with a horizontal axis as part of pre-processing the image for use as training data to generate a machine learning algorithm or to provide to an already generated machine learning algorithm to identify lane markings.

FIG. 9B illustrates an image segment 910 of a portion of a road. The road depicted in the image segment 910 corresponds to the road depicted in the image segment 900. However, the image segment 910 includes a mask or overlay layer that identifies or otherwise labels lane markings on the road. This mask covers the lane markings in the depiction of the road with labels that are interpretable by a computing system, such as the map generation system 200. As with the image segment 810, a user may interact with the map generation system 200 to create the mask or overlay layer. The map generation system 200 may supply the image segment 810 as training data to the model generation system 204.

Figure 9C:
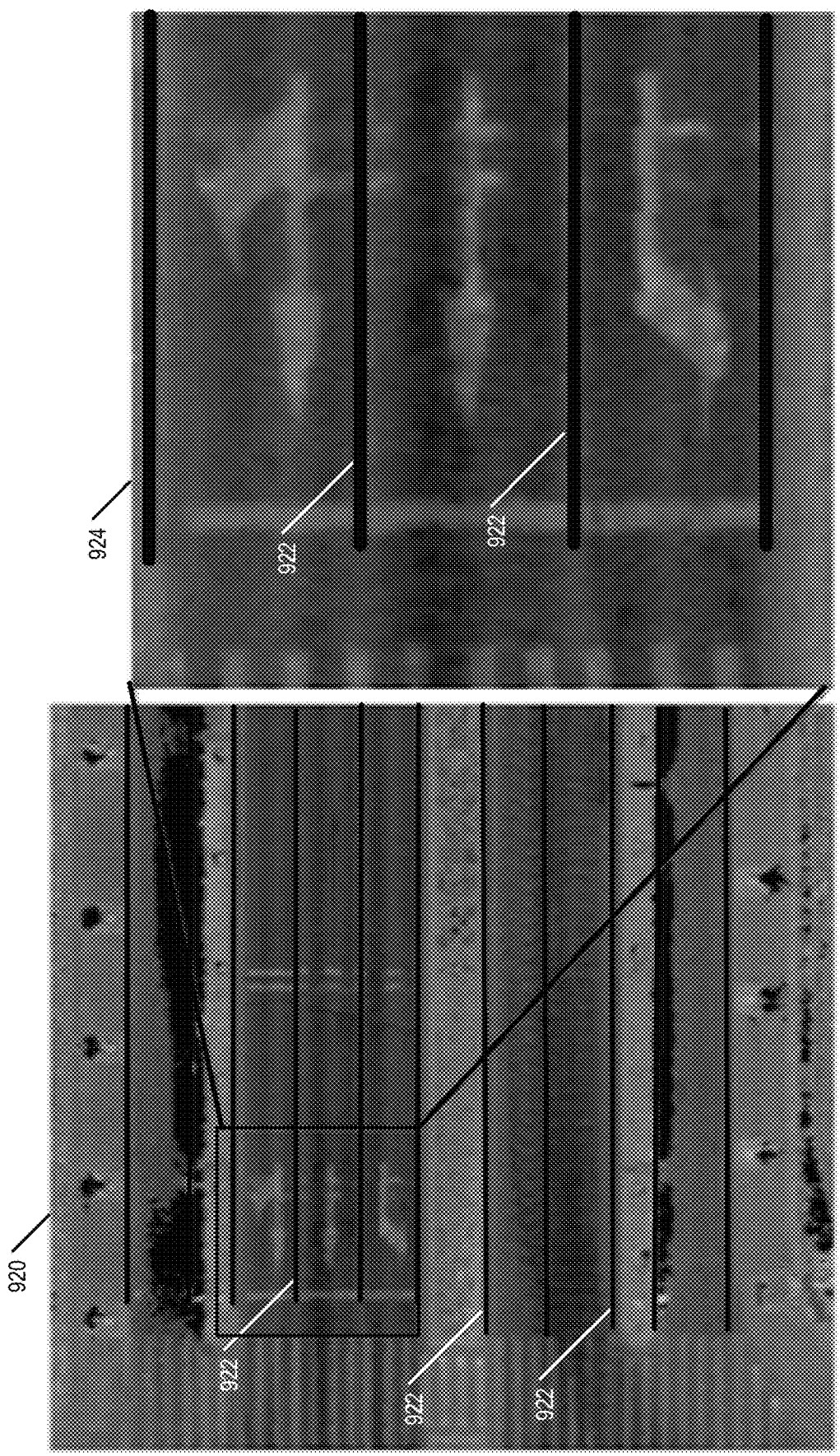
FIG. 9C illustrates a portion of an image segment corresponding to the image segments of FIGS. 9A and 9B after lane markings determined by the machine learning model have been applied to the image in accordance with certain embodiments.

FIG. 9C illustrates a portion of an image segment corresponding to the image segments of FIGS. 9A and 9B after lane markings determined by the machine learning model have been applied to the image in accordance with embodiments disclosed herein. The lane detection system 206 generates the lane markings or labels 922 of the image segment 920 using a machine learning model. As can be seen by the zoomed in portion 924 in FIG. 9C, the generated labels are roughly consistent with the actual lane markings that were included in the original image. For ease of illustration, not all the lane markings are marked within FIG. 9C. However, it should be understood that each of the elements matching the marked lane markings 922 are included as part of the lane markings 922.

Figure 9D:
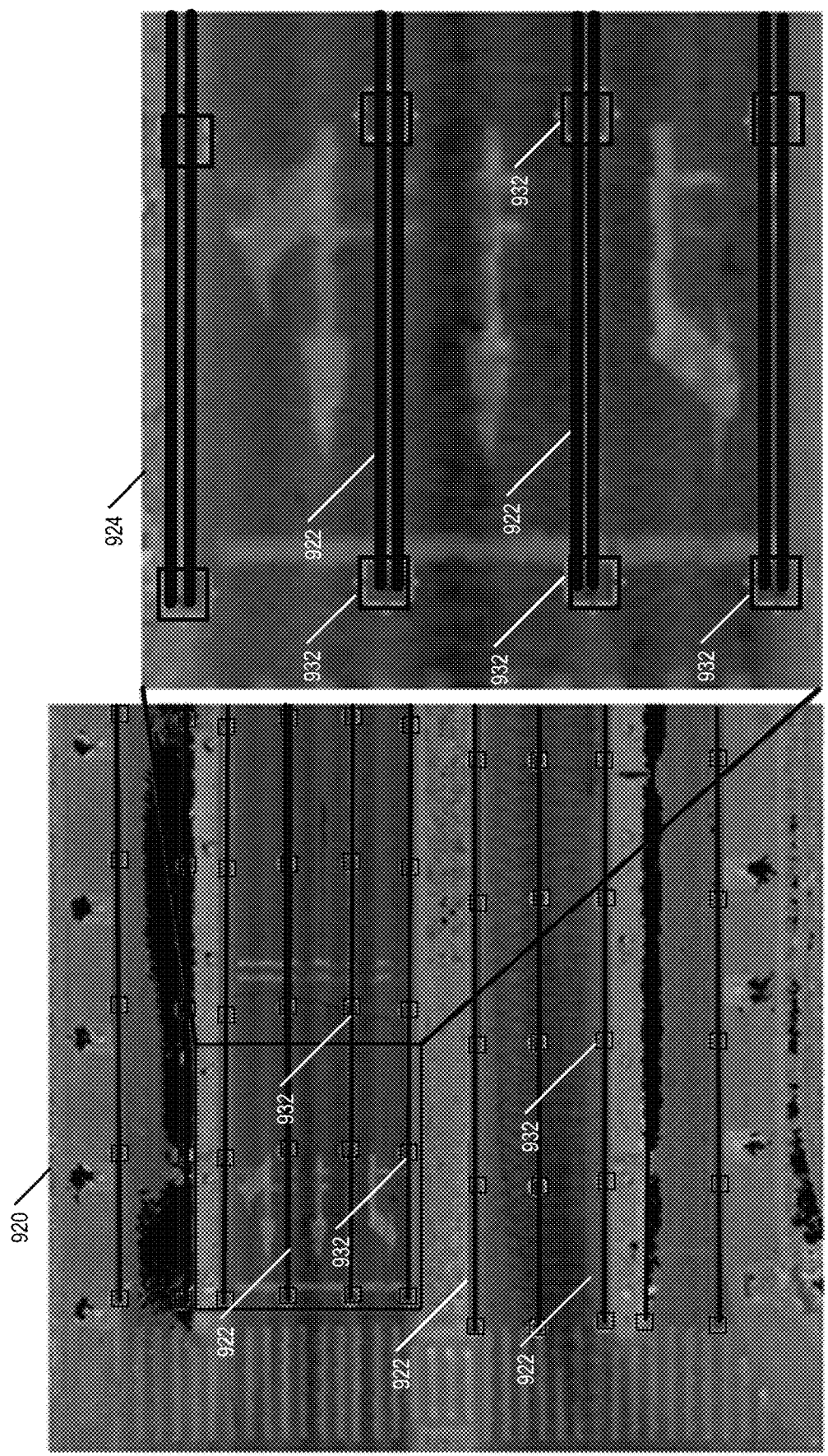
FIG. 9D illustrates the image segments depicted in FIG. 9C, but with bounding box labels corresponding to the lane markings in accordance with certain embodiments.

FIG. 9D illustrates the image segments depicted in FIG. 9C, but with bounding box labels 932 corresponding to the lane markings. The bounding box labels 932 may be added to the lane markings by the lane detection system 206, for example, as part of the operations associated with the block 510. Advantageously, in certain embodiments, the bounding box labels may facilitate an autonomous vehicle identifying lanes within which to keep the vehicle. In certain embodiments, the bounding box markings may be used to facilitate the map generation system 200 or the lane detection system 206 identifying lane markings. The lane detection system 206, using for example a machine learning model, may identify the location of bounding boxes based on a probability that a lane marking exists, crosses through, or touches a point, pixel, or set of pixels in the image. A bounding box may be placed at the point, or surrounding a threshold number of pixels centered at the point. Using, for example, a polyline process, the lane markings may be identified by connecting at least some of the bounding boxes. The determination of whether sets of bounding boxes are to be connected to form a line associated with a lane marking may be based at least in part on a probability output by one or more of the machine learning models. For ease of illustration, not all the bounding box labels are marked within FIG. 9D. However, it should be understood that each of the elements matching the marked bounding box labels 932 are included as part of the bounding box labels 932.

Figure 10:
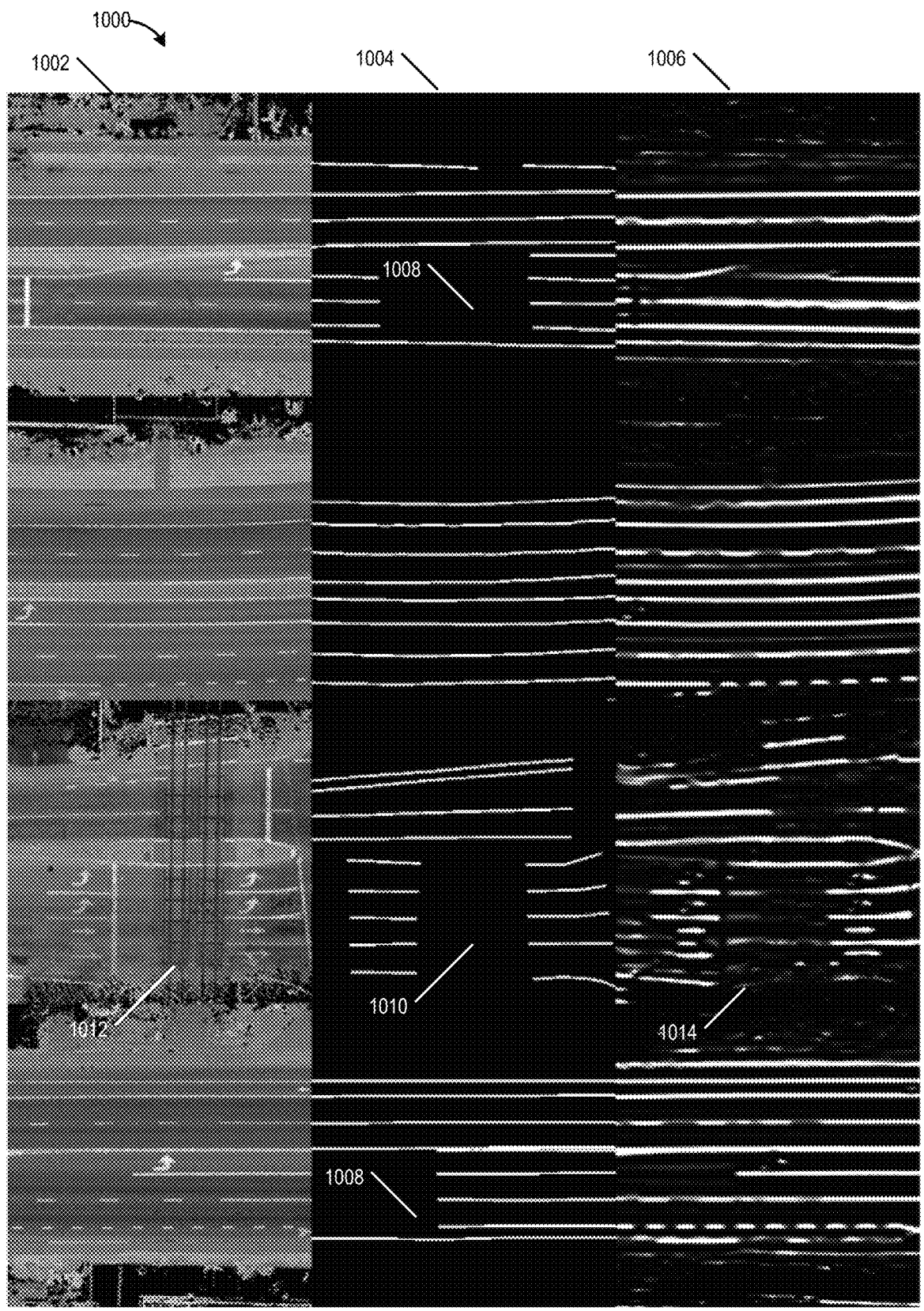
FIG. 10 illustrates an image comparison of lane marking identification processes.

FIG. 10 illustrates an image comparison 1000 of lane marking identification processes. The image comparison 1000 includes three columns 1002, 1004, and 1006. Column 1002 represents various image segments of a road that has been divided into multiple segments to minimize the amount of curvature depicted in the image segments and rotated to align each of the road segments with a horizontal axis.

Column 1004 corresponds to column 1002, but illustrates lane markings determined by a machine learning system that does not implement the features disclosed herein. As can be seen from the lane markings in column 1004, existing system have trouble distinguishing different types of lane markings. For example, the outputs included in column 1004 do not distinguish between solid lines and dashed line markings. Further, as illustrated by the blocks 1008, some existing systems are unable to process or identify lane markings when lanes are divided or split. In addition, existing systems do not extrapolate lanes were lane markings do not exist as illustrated by the block 1010.

Column 1006 corresponds to columns 1002 and 1004, but illustrates lane markings determined by the lane detection system 206 implementing embodiments disclosed herein. Comparing column 1006 with column 1004, it can be determined that the lane detection system 206 includes a number of improvements over existing systems. For example, the lane detection system 206 is able to distinguish different types of lane markings, such as dashed lines versus solid lines. Further, as illustrated by the lack of the blank spaces corresponding to the blocks 1008 of column 1004, the lane detection system 206 is able to process lane divisions and include markings or labels that identify or correspond to the branching of lanes. For example, as can be seen in the top road segment in column 1002, one of the lanes branches to allow for a separate turn lane. The lane branching is not captured in column 1004 corresponding to existing systems. However, the lane branching is illustrated in column 1006, which implements embodiments described herein.

Further, as illustrated in column 1006, the lane detection system 206 is capable of extrapolating the continuation of lanes when there is a lack of lane markings. While some existing systems are confused by crossing railroad tracks 1012 and lack of lane markings (as illustrated by empty block 1010), the lane detection system 206 implementing embodiments disclosed herein is capable of determining the continuity of the lanes without the lane markings (as illustrated by the markings in block 1014 of column 1006 corresponding to the empty block 1010 of column 1004) and of distinguishing between the lane markings and image noise, such as the railroad tracks 1012.

Further, while the comparison system used to generate the lane markings in column 1004 do not identify additional street markings, as illustrated in column 1006, the lane detection system 206 is capable of detecting additional street markings, such as turn arrows and continue straight arrows. The ability to detect the arrows marked in the road images is illustrated in the third set of example figures in FIG. 10.

Accordingly, in certain embodiments, as can be determined via the image comparison 1000, the map generation system 200 using less training data than existing systems, can generate more accurate lane markings than existing systems. Moreover, in certain embodiments, the pre-processing of images enables a reduction of computing resources for both training machine learning systems and for executing machine learning models.

In regard to the figures described herein, other embodiments are possible within the scope of the present invention, such that the above-recited components, steps, blocks, operations, and/or messages/requests/queries/instructions are differently arranged, sequenced, sub-divided, organized, and/or combined. In some embodiments, a different component may initiate or execute a given operation. For example, in some embodiments, the map image processing system 202 can be divided into several systems including a system for image segmentation, a system for image rotation, a system for noise filtering, and a system for binary and/or grayscale image generation. As another example, in some embodiments, the rotation and cropping of an image segment may be performed sequentially with either process being performed first, or each process may be performed at least partially in parallel.

Example Embodiments

Some example enumerated embodiments of the present invention are recited in this section in the form of methods, systems, and non-transitory computer-readable media, without limitation.

One aspect of the disclosure provides a computer-implemented method of pre-processing images from a map image to facilitate an automated process of determining lane markings. The computer-implemented method may be implemented by a map image processing system comprising one or more hardware processors and configured with specific computer-executable instructions. Further, the computer-implemented method may comprise: receiving an image of a road network; converting the image to a binary image; using the binary image to identify a road within the road network; dividing a portion of the image including a depiction of the road into image segments, each image segment including a depiction of a road segment of the road; determining a target axis for road segments of the road; rotating at least one image segment to align the road segment depicted in the at least one image segment with the target axis; and using the rotated at least one image segment to identify lane markings within the image of the road network.

The method of the preceding paragraph can include any sub-combination of the following features: where the image comprises a map of the road network; where the image comprises a top-down two-dimensional view of the road network; where the image comprises a high definition image; where the method further comprises cropping a portion of at least one of the image segments to exclude content that does not depict a portion of the road segment from the at least one image segment; where the target axis comprises a horizontal axis; where the method further comprises storing the rotated at least one image segment at a mapping repository, wherein the mapping repository stores training data for a model generation system that generates a machine learning model to automatically identify lane markings in images of road networks; where the method further comprises storing an indication of a degree of rotation of the rotated at least one image segment at the mapping repository; where using the binary image to identify the road within the road network comprises: determining contours of the road based on a transition between black and white pixels in the binary image; selecting a plurality of inflection points within the binary image; based at least in part on a comparison of gradients among the plurality of inflection points, identifying a starting position and an ending position of the road; and identifying the road based on the identified starting position and the identified ending position; and where the method further comprises providing the rotated at least one image segment and an overlay comprising the identified lane markings to a machine learning model generation system as training data to generate a machine learning model that identifies lane markings in images of road networks.

Another aspect of the disclosure provides a system for pre-processing images from a map image to facilitate an automated process of determining lane markings. The system may include a non-volatile storage configured to store images of road networks; and a map image processing system comprising one or more hardware processors. The map image processing system may be configured to: access an image of a road network from the non-volatile storage; convert the image to a grayscale image; use the grayscale image to identify a road within the road network; generate image segments based on a portion of the image including a depiction of the road, each image segment including a depiction of a road segment of the road; determine a target axis for road segments of the road; rotate at least one image segment to align the road segment depicted in the at least one image segment with the target axis; and use the rotated at least one image segment to identify lane markings within the image of the road network.

The system of the preceding paragraph can include any sub-combination of the following features: where the map image processing system is further configured to crop a portion of at least one of the image segments to exclude content that does not depict a portion of the road segment from the at least one image segment; where the map image processing system is further configured to store the rotated at least one image segment at the non-volatile storage, and wherein the non-volatile storage is further configured to store training data for a model generation system that generates a machine learning model to automatically identify lane markings in images of road networks; where the map image processing system is further configured to store a measurement of a degree of rotation of the rotated at least one image segment at the non-volatile storage; where the map image processing system is further configured to use the rotated at least one image segment to identify lane markings within the image of the road network by at least: determining contours of the road based on a transition between at least two color gradients in the grayscale image; selecting a plurality of inflection points within the grayscale image; based at least in part on a comparison of gradients among the plurality of inflection points, identifying a starting position and an ending position of the road; and identifying the road based on the identified starting position and the identified ending position; and where the map image processing system is further configured to provide the rotated at least one image segment and the identified lane markings to a machine learning model generation system as training data to generate a machine learning model that identifies lane markings in images of road networks.

Yet another aspect of the disclosure provides a non-transitory computer-readable storage medium storing computer executable instructions that, when executed by one or more computing devices, configure the one or more computing devices to perform a set of operations. The operations may include: receiving an image of a road network; converting the image to a binary image; using the binary image to identify a road within the road network; generating image segments based on a portion of the image including a depiction of the road, each image segment including a depiction of a road segment of the road; determining a target axis for road segments of the road; rotating at least one image segment to align the road segment depicted in the at least one image segment with the target axis; and using the rotated at least one image segment to identify lane markings within the image of the road network.

The non-transitory computer-readable storage medium of the preceding paragraph can include any sub-combination of the following features: where the operations further comprise removing a portion of at least one of the image segments to exclude content that does not depict a portion of the road segment from the at least one image segment; where the operations further comprise using the rotated at least one image segment to identify lane markings within the image of the road network by: determining contours of the road based on a transition between black and white pixels in the binary image; selecting a plurality of inflection points within the binary image; based at least in part on a comparison of gradients among the plurality of inflection points, identifying a starting position and an ending position of the road; and identifying the road based on the identified starting position and the identified ending position; and where the operations further comprise providing the rotated at least one image segment and the identified lane markings to a machine learning model generation system as training data to generate a machine learning model that identifies lane markings in images of road networks.

Another aspect of the disclosure provides a computer-implemented method of generating a lane marking machine learning model using a pre-processed image dataset. The computer-implemented method may be implemented by a model generation system comprising one or more hardware processors and configured with specific computer-executable instructions. Further, the computer-implemented method may comprise: receiving a set of training data comprising normalized images of road segments; generating a lane marking overlay for each of the normalized images, the lane marking overlay corresponding to lane markings of road segments depicted in the normalized images; performing a data augmentation process on each of the normalized images and the corresponding lane marking overlay for each of the normalized images to obtain a set of augmented images; and generating one or more machine learning models based at least in part on the set of training data, the lane marking overlay for each of the normalized images, and the set of augmented images.

The method of the preceding paragraph can include any sub-combination of the following features: where each of the normalized images of road segments comprise a binary image derived from a segment of a high definition image; where the set of training data comprises at least one normalized image without lane markings; where said generating the lane marking overlay excludes generating a lane marking overlay for the at least one normalized image without lane markings; where said generating the lane marking overlay comprises generating a lane marking overlay indicating a lack of lane markings for the at least one normalized image without lane markings; where performing the data augmentation process comprises rotating each of the normalized images and the corresponding lane marking overlay for each of the normalized images to obtain the set of augmented images; where at least some of the normalized images are rotated by a different amount than at least some other of the normalized images; where at least some of the normalized images are rotated by a random or pseudo-random number of degrees; where the set of training data comprises a second set of normalized images of road segments, and wherein the second set of normalized images is excluded from said performing the data augmentation process; where each of the normalized images of road segments are normalized such that a corresponding road segment depicted in the normalized image is rotated to align along an axis, and wherein the axis is the same for each of the normalized images; where said generating one or more machine learning models comprises generating a plurality of machine learning models and wherein the method further comprises selecting a machine learning model from the plurality of machine learning models based on one or more selection factors; and where the one or more selection factors comprise: a complexity of each machine learning model; an accuracy of each machine learning model; or an amount of time to execute each machine learning model.

Another aspect of the disclosure provides a system for generating a lane marking machine learning model using a pre-processed image dataset. The system may include a non-volatile storage configured to store training data for generating one or more machine learning models to identify lane markings within an image of a road network; and a model generation system comprising one or more hardware processors. The model generation system may be configured to: access from the non-volatile storage a set of training data comprising normalized images of road segments; generate a lane marking overlay for each of the normalized images, the lane marking overlay corresponding to lane markings of road segments depicted in the normalized images; obtain a set of augmented images using a data augmentation process applied to the normalized images and the corresponding lane marking overlays; and generate one or more machine learning models based at least in part on the set of training data, the lane marking overlay for each of the normalized images, and the set of augmented images.

The system of the preceding paragraph can include any sub-combination of the following features: where the set of training data comprises at least one normalized image without lane markings and wherein the one or more hardware processors are further configured to exclude the at least one normalized image without lane markings when generating the lane marking overlay for each of the normalized images; where the set of training data comprises at least one normalized image without lane markings and wherein the model generation system is further configured to generate a lane marking overlay indicating a lack of lane markings for the at least one normalized image without lane markings when generating the lane marking overlay for each of the normalized images; where the model generation system is further configured to perform the data augmentation process by at least rotating each of the normalized images and the corresponding lane marking overlay for each of the normalized images to obtain the set of augmented images; where at least some of the normalized images are rotated by a different amount than at least some other of the normalized images; where the set of training data comprises a second set of normalized images of road segments, and wherein the model generation system is further configured to exclude the second set of normalized images from the data augmentation process; and where each of the normalized images of road segments are normalized such that a corresponding road segment depicted in the normalized image is rotated to align along an axis, and wherein the axis is the same for each of the normalized images.

Yet another aspect of the disclosure provides a non-transitory computer-readable storage medium storing computer executable instructions that, when executed by one or more computing devices, configure the one or more computing devices to perform a set of operations. The operations may include: receiving a set of training data comprising normalized images of road segments; generating a lane marking overlay for each of the normalized images, the lane marking overlay corresponding to lane markings of road segments depicted in the normalized images; obtaining a set of augmented images based on the normalized images and the corresponding lane marking overlays; and generating one or more machine learning models based at least in part on the set of training data, the lane marking overlay for each of the normalized images, and the set of augmented images.

Another aspect of the disclosure provides a computer-implemented method of performing an automated lane marking process on an image of a road network using a machine learning model. The computer-implemented method may be implemented by a lane detection system comprising one or more hardware processors and configured with specific computer-executable instructions. Further, the computer-implemented method may comprise: accessing a rotated image segment depicting a road segment, wherein the rotated image segment comprises a rotated portion of an image of a road network, and wherein the rotated image segment is rotated to align the road segment with a target axis; applying the rotated image segment to a machine learning model to obtain a lane marked rotated image segment; determining a degree of rotation with respect to the target axis of the rotated image segment; counter rotating the lane marked rotated image segment by the degree of rotation to obtain a lane-marked image segment; and updating the image of the road network based at least in part on the lane-marked image segment to obtain an updated image.

The method of the preceding paragraph can include any sub-combination of the following features: where lane markings on the lane-marked rotated image segment or on the lane-marked image segment are included as part of an overlay layer that provides lane marking data for one or more of: a vehicle routing system, a driver-assist system, or an autonomous vehicle system; where the degree of rotation comprises an amount that a portion of the image of the road network was rotated to obtain the rotated image segment; where the degree of rotation is determined from metadata associated with the rotated image segment; where the image of the road network comprises a map of the road network; where updating the image of the road network comprises replacing a corresponding portion of the image with the lane-marked image segment; where updating the image of the road network comprises applying lane markings from the lane-marked image segment to a corresponding portion of the image; where the method further comprises storing the updated map at a map repository configured to store mapping data for one or more of: a vehicle routing system, a driver-assist system, or an autonomous vehicle system; and where the target axis comprises a horizontal axis.

Another aspect of the disclosure provides a system for performing an automated lane marking process on an image of a road network using a machine learning model. The system may include a storage configured to store rotated image segments depicting portions of roads rotated to align with a target axis; and a lane detection system comprising one or more hardware processors. Further, the lane detection system may be configured to: access from the storage a rotated image segment depicting a road segment, wherein the rotated image segment is a rotated portion of an image of a road network, and wherein the rotated image segment is rotated to align the road segment with the target axis; input the rotated image segment to a machine learning model to obtain a lane-marked rotated image segment; determine a degree of rotation with respect to the target axis of the rotated image segment; counter rotate the lane-marked rotated image segment by the degree of rotation to obtain a lane-marked image segment; and modify the image of the road network based at least in part on the lane-marked image segment to obtain a modified image.

The system of the preceding paragraph can include any sub-combination of the following features: where the lane detection system is further configured to generate an overlay layer that includes lane markings from the lane-marked rotated image segment or the lane-marked image segment, and wherein the overlay layer is provided to one or more of: a vehicle routing system, a driver-assist system, or an autonomous vehicle system; where the degree of rotation comprises an amount that a portion of the image of the road network was rotated to obtain the rotated image segment; where the lane detection system is further configured to modify the image of the road network by replacing a corresponding portion of the image with the lane-marked image segment; where the lane detection system is further configured to modify the image of the road network by applying lane markings from the lane-marked image segment to a corresponding portion of the image; where the lane detection system is further configured to store the modified map at a map repository configured to store mapping data for one or more of: a vehicle routing system, a driver-assist system, or an autonomous vehicle system; and where the storage comprises the map repository.

Yet another aspect of the disclosure provides a non-transitory computer-readable storage medium storing computer executable instructions that, when executed by one or more computing devices, configure the one or more computing devices to perform a set of operations. The operations may include: obtaining a rotated image segment depicting a road segment, wherein the rotated image segment is a rotated portion of an image of a road network, and wherein the rotated image segment is rotated to align the road segment with a target axis; applying the rotated image segment as input to a machine learning model to obtain a lane-marked rotated image segment; determining a degree of rotation with respect to the target axis of the rotated image segment; counter rotating the lane-marked rotated image segment by the degree of rotation to obtain a lane-marked image segment; and annotating the image of the road network based at least in part on the lane-marked image segment to obtain an annotated image.

The non-transitory computer-readable storage medium of the preceding paragraph can include any sub-combination of the following features: where the operations further comprise: generating an overlay layer that includes lane markings from the lane-marked rotated image segment or the lane-marked image segment; and providing the overlay layer to one or more of: a vehicle routing system, a driver-assist system, or an autonomous vehicle system; where annotating the image of the road network comprises replacing a corresponding portion of the image with the lane-marked image segment; and where annotating the image of the road network comprises applying lane markings from the lane-marked image segment to a corresponding portion of the image.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method of pre-processing images from a map image to facilitate an automated process of determining lane markings, the computer-implemented method comprising:
   as implemented by a map image processing system comprising one or more hardware processors and configured with specific computer-executable instructions,
   receiving an image of a road network;
   converting the image to a binary image;
   using the binary image to identify a road within the road network by at least:
      determining contours of the road based on a transition between black and white pixels in the binary image;
      selecting a plurality of inflection points within the binary image;
      based at least in part on a comparison of gradients among the plurality of inflection points, identifying a starting position and an ending position of the road; and
      identifying the road based on the starting position and the ending position of the road within the image;
   dividing a portion of the image including a depiction of the road into image segments, each image segment including a depiction of a road segment of the road;
   determining a target axis for road segments of the road;
   rotating at least one image segment to align the road segment depicted in the at least one image segment with the target axis; and
   using the rotated at least one image segment to identify lane markings within the image of the road network.

2. The computer-implemented method of claim 1, wherein the image comprises a map of the road network.

3. The computer-implemented method of claim 1, wherein the image comprises a top-down two-dimensional view of the road network.

4. The computer-implemented method of claim 1, wherein the image comprises a high definition image.

5. The computer-implemented method of claim 1, further comprising cropping a portion of at least one of the image segments to exclude content that does not depict a portion of the road segment from the at least one image segment.

6. The computer-implemented method of claim 1, wherein the target axis comprises a horizontal axis.

7. The computer-implemented method of claim 1, further comprising storing the rotated at least one image segment at a mapping repository, wherein the mapping repository stores training data for a model generation system that generates a machine learning model to automatically identify lane markings in images of road networks.

8. The computer-implemented method of claim 7, further comprising storing an indication of a degree of rotation of the rotated at least one image segment at the mapping repository.

9. The computer-implemented method of claim 1, further comprising providing the rotated at least one image segment and an overlay comprising the identified lane markings to a machine learning model generation system as training data to generate a machine learning model that identifies lane markings in images of road networks.

10. The computer-implemented method of claim 1, wherein the image is generated from one or more of a LiDAR sensor, a radar sensor, an infrared camera, a visible light camera, stereo cameras, or a satellite.

11. The computer-implemented method of claim 1, wherein converting the image to the binary image further comprises emphasizing a depiction of the road network within the binary image over non-road elements depicted in the binary image.

12. The computer-implemented method of claim 1, wherein at least one image segment of the image segments is a different size than at least one other image segment of the image segments.

13. A system for pre-processing images from a map image to facilitate an automated process of determining lane markings, the system comprising:
a non-volatile storage configured to store images of road networks; and
a map image processing system comprising one or more hardware processors configured to:
access an image of a road network from the non-volatile storage;
convert the image to a grayscale image;
use the grayscale image to identify a road within the road network;
generate image segments based on a portion of the image including a depiction of the road, each image segment including a depiction of a road segment of the road;
determine a target axis for road segments of the road;
rotate at least one image segment to align the road segment depicted in the at least one image segment with the target axis; and
use the rotated at least one image segment to identify lane markings within the image of the road network by at least:
determining contours of the road based on a transition between at least two color gradients in the grayscale image;
selecting a plurality of inflection points within the grayscale image;
based at least in part on a comparison of gradients among the plurality of inflection points, identifying a starting position and an ending position of the road; and
identifying the road based on the identified starting position and the identified ending position of the road.

14. The system of claim 13, wherein the map image processing system is further configured to crop a portion of at least one of the image segments to exclude content that does not depict a portion of the road segment from the at least one image segment.

15. The system of claim 13, wherein the map image processing system is further configured to store the rotated at least one image segment at the non-volatile storage, and wherein the non-volatile storage is further configured to store training data for a model generation system that generates a machine learning model to automatically identify lane markings in images of road networks.

16. The system of claim 15, wherein the map image processing system is further configured to store a measurement of a degree of rotation of the rotated at least one image segment at the non-volatile storage.

17. The system of claim 13, wherein the map image processing system is further configured to provide the rotated at least one image segment and the identified lane markings to a machine learning model generation system as training data to generate a machine learning model that identifies lane markings in images of road networks.

18. A non-transitory computer-readable storage medium storing computer executable instructions that, when executed by one or more computing devices, configure the one or more computing devices to perform operations comprising:
receiving an image of a road network;
converting the image to a binary image;
using the binary image to identify a road within the road network;
generating image segments based on a portion of the image including a depiction of the road, each image segment including a depiction of a road segment of the road;
determining a target axis for road segments of the road;
rotating at least one image segment to align the road segment depicted in the at least one image segment with the target axis; and
using the rotated at least one image segment to identify lane markings within the image of the road network by at least:
determining contours of the road based on a transition between black and white pixels in the binary image;
selecting a plurality of inflection points within the binary image;
based at least in part on a comparison of gradients among the plurality of inflection points, identifying a starting position and an ending position of the road; and
identifying the road based on the identified starting position and the identified ending position.

19. The non-transitory computer-readable storage medium of claim 18, wherein the operations further comprise removing a portion of at least one of the image segments to exclude content that does not depict a portion of the road segment from the at least one image segment.

20. The non-transitory computer-readable storage medium of claim 18, wherein the operations further comprise providing the rotated at least one image segment and the identified lane markings to a machine learning model generation system as training data to generate a machine learning model that identifies lane markings in images of road networks.

* * * * *